US012785105B2

(12) United States Patent
Jain

(10) Patent No.: US 12,785,105 B2
(45) Date of Patent: Nov. 3, 2026

(54) SECONDARY BATTERY

(71) Applicant: MURATA MANUFACTURING CO., LTD., Kyoto (JP)

(72) Inventor: Nidhi Jain, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 680 days.

(21) Appl. No.: 18/215,562

(22) Filed: Jun. 28, 2023

(65) Prior Publication Data

US 2023/0343965 A1 Oct. 26, 2023

Related U.S. Application Data

(63) Continuation of application No. PCT/JP2022/001935, filed on Jan. 20, 2022.

(30) Foreign Application Priority Data

Feb. 9, 2021 (JP) ................................ 2021-019148

(51) Int. Cl.
*H01M 4/13* (2010.01)
*H01M 4/62* (2006.01)
(Continued)

(52) U.S. Cl.
CPC ............ *H01M 4/628* (2013.01); *H01M 4/13* (2013.01); *H01M 10/0525* (2013.01); *H01M 2004/027* (2013.01)

(58) Field of Classification Search
CPC ........ H01M 4/628; H01M 4/13; H01M 4/131; H01M 4/13
See application file for complete search history.

(56) References Cited

U.S. PATENT DOCUMENTS

2004/0029016 A1* 2/2004 Hwang ............... H01M 10/052 429/189
2008/0311472 A1 12/2008 Yamaguchi et al.
(Continued)

FOREIGN PATENT DOCUMENTS

JP 2002134167 A 5/2002
JP 2003077534 A 3/2003
(Continued)

OTHER PUBLICATIONS

International Search Report of corresponding PCT application PCT/JP2022/001935, dated Mar. 29, 2022.
(Continued)

*Primary Examiner* — Kenneth J Douyette
(74) *Attorney, Agent, or Firm* — K&L Gates LLP

(57) ABSTRACT

A secondary battery includes a positive electrode, a negative electrode, and an electrolytic solution. The negative electrode includes a negative electrode active material layer and a film. The film covers a surface of the negative electrode active material layer. The film includes sulfur and oxygen. A first peak derived from $SO^{2-}$ and a second peak derived from $S^-$ are detectable based on a negative ion analysis of the film by time-of-flight secondary ion mass spectrometry. A ratio of an intensity of the second peak to an intensity of the first peak is greater than or equal to 0.100 and less than or equal to 0.250.

6 Claims, 2 Drawing Sheets

(51) Int. Cl.

| | |
|---|---|
| ***H01M 10/0525*** | (2010.01) |
| *H01M 4/02* | (2006.01) |

(56) References Cited

U.S. PATENT DOCUMENTS

| | | | | |
|---|---|---|---|---|
| 2009/0111020 | A1 | 4/2009 | Yamaguchi et al. | |
| 2009/0239154 | A1 | 9/2009 | Lee et al. | |
| 2010/0178557 | A1 | 7/2010 | Lee et al. | |
| 2017/0229736 | A1 | 8/2017 | Shimanuki et al. | |
| 2018/0013168 | A1* | 1/2018 | Yu | H01M 4/36 |
| 2020/0243905 | A1* | 7/2020 | Xu | H01M 10/0564 |

FOREIGN PATENT DOCUMENTS

| | | | |
|---|---|---|---|
| JP | 2008135382 | A | 6/2008 |
| JP | 2009021229 | A | 1/2009 |
| JP | 2010010080 | A | 1/2010 |
| JP | 2010501982 | A | 1/2010 |
| JP | 2010506373 | A | 2/2010 |
| JP | 2013145732 | A | 7/2013 |
| JP | 5350243 | B2 | 11/2013 |
| WO | 2016021596 | A1 | 2/2016 |

OTHER PUBLICATIONS

Ota, Hitoshi et al.; "XAFS and TOF-SIMS analysis of SEI layers on electrodes"; Journal of Power Sources; 2003; 119-121, 567-571.

Shiga, Tohru et al.; "Anode Material Associated with Polymeric Networking of Triflate Ions Formed on Mg."; Journal of Physical Chemistry; C. 2015.; 119, 3488-3494.

Simon, Fabian J. et al.; "Properties of the Interphase Formed between Argyrodite-Type Li6PS5Cl and Polymer-Based PEO10:LiTFSI"; ACS Applied Materials & Interfaces; 2019; 11, 42186-42196.

Fiedler, Carsten et al.; "XPS and SIMS Analysis of Solid Electrolyte Interphases on Lithium Formed by Ether-Based Electrolytes"; Journal of The Electrochemical Society; 2017; 164; A3742-A3749.

* cited by examiner

SECONDARY BATTERY

CROSS REFERENCE TO RELATED APPLICATIONS

The present application is a continuation of PCT patent application no. PCT/JP2022/001935, filed on Jan. 20, 2022, which claims priority to Japanese patent application no. JP2021-019148, filed on Feb. 9, 2021, the entire contents of which are incorporated herein by reference.

BACKGROUND

The present technology relates to a secondary battery.

Various kinds of electronic equipment, including mobile phones, have been widely used. Such widespread use has promoted development of a secondary battery as a power source that is smaller in size and lighter in weight and allows for a higher energy density. The secondary battery includes a positive electrode, a negative electrode, and an electrolytic solution. A configuration of the secondary battery has been considered in various ways.

For example, in order to improve a cyclability characteristic, in a case where a positive electrode active material includes lithium cobalt oxide having a specific composition and a negative electrode active material includes artificial graphite having a specific physical property, propane sultone and a sulfide compound are included in a non-aqueous electrolytic solution. Similarly, in order to improve a cyclability characteristic, a disulfide compound is included in a non-aqueous electrolytic solution.

In order to improve a cyclability characteristic, a peak of a positive secondary ion having a specific composition ($C_nH_{n+1}S$) is detectable based on an analysis of a negative electrode (a film) by time-of-flight secondary ion mass spectrometry, and sultone and an acid anhydride are included in an electrolyte. In order to improve a cyclability characteristic under a high temperature condition, a compound represented by $(XSO_2)(X'SO_2)N^-Li^+$ (each of X and X' is a fluorine atom, etc.) is included in a non-aqueous electrolytic solution, and an abundance ratio of S atoms is greater than or equal to 0.5% based on a surface analysis of a negative electrode by XPS. In order to improve a cyclability characteristic, lithium ethanedisulfonate is included in an electrolytic solution.

SUMMARY

The present technology relates to a secondary battery.

Although consideration has been given in various ways regarding a battery characteristic of a secondary battery, the secondary battery still remains insufficient in a battery capacity characteristic, a swelling characteristic, and an electric resistance characteristic. Accordingly, there is room for improvement in terms thereof.

It is therefore desirable to provide a secondary battery that is able to improve battery capacity characteristic, swelling characteristic, electric resistance characteristic, and other battery characteristics according to an embodiment of the present technology.

A secondary battery according to an embodiment of the present technology includes a positive electrode, a negative electrode, and an electrolytic solution. The negative electrode includes a negative electrode active material layer and a film. The film covers a surface of the negative electrode active material layer. The film includes sulfur and oxygen. A first peak derived from $SO^{2-}$ and a second peak derived from $S^-$ are detectable based on a negative ion analysis of the film by time-of-flight secondary ion mass spectrometry. A ratio of an intensity of the second peak to an intensity of the first peak is greater than or equal to 0.100 and less than or equal to 0.250.

According to the secondary battery of the embodiment of the present technology, the negative electrode includes the film covering the surface of the negative electrode active material layer, and the film includes sulfur and oxygen as constituent elements. Based on the negative ion analysis of the film by the time-of-flight secondary ion mass spectrometry, the first peak derived from $SO^{2-}$ and the second peak derived from $S^-$ are detectable, and the ratio of the intensity of the second peak to the intensity of the first peak is greater than or equal to 0.100 and less than or equal to 0.250. Accordingly, it is possible to achieve a superior battery capacity characteristic, a superior swelling characteristic, and a superior electric resistance characteristic.

Note that effects of the present technology are not necessarily limited to those described herein and may include any of a series of suitable effects in relation to the present technology.

DETAILED DESCRIPTION

One or more embodiments of the present technology are described below in further detail including with reference to the drawings.

A description is provided of a secondary battery according to an embodiment of the present technology.

The secondary battery to be described here is a secondary battery that obtains a battery capacity using insertion and extraction of an electrode reactant, and includes a positive electrode, a negative electrode, and an electrolytic solution which is a liquid electrolyte. In the secondary battery, to prevent precipitation of the electrode reactant on a surface of the negative electrode during charging, a charge capacity of the negative electrode is preferably greater than a discharge capacity of the positive electrode. In other words, an electrochemical capacity per unit area of the negative electrode is preferably greater than an electrochemical capacity per unit area of the positive electrode.

Although not particularly limited in kind, the electrode reactant is specifically a light metal such as an alkali metal or an alkaline earth metal. Examples of the alkali metal include lithium, sodium, and potassium. Examples of the alkaline earth metal include beryllium, magnesium, and calcium.

Examples are given below of a case where the electrode reactant is lithium. A secondary battery that obtains a battery capacity using insertion and extraction of lithium is a so-called lithium-ion secondary battery. In the lithium-ion secondary battery, lithium is inserted and extracted in an ionic state.

Figure 1:
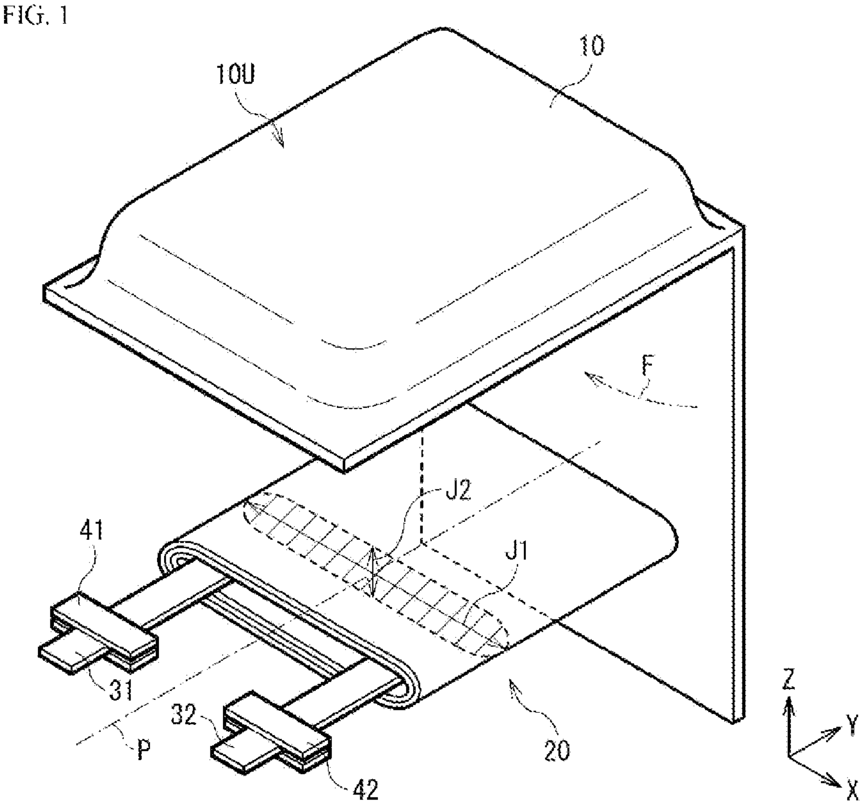
FIG. 1 is a perspective view of a configuration of a secondary battery according to an embodiment of the present technology.
Figure 2:
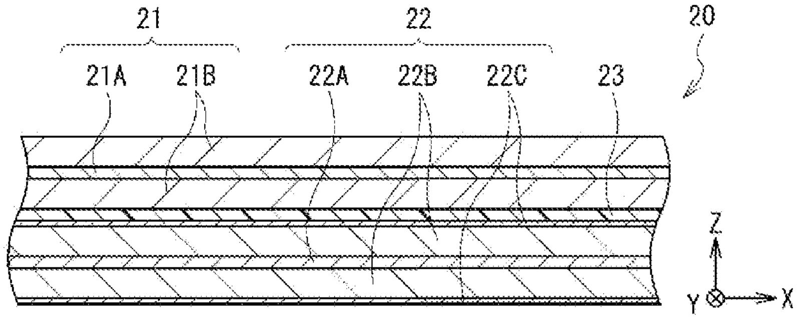
FIG. 2 is a sectional view of a configuration of a battery device illustrated in FIG. 1.

FIG. 1 illustrates a perspective configuration of the secondary battery. FIG. 2 illustrates a sectional configuration of a battery device 20 illustrated in FIG. 1.

Note that FIG. 1 illustrates a state in which an outer package film 10 and the battery device 20 are separated away from each other, and a section of the battery device 20 along an XZ plane is indicated by a dashed line. FIG. 2 illustrates only a portion of the battery device 20 in an enlarged manner.

As illustrated in FIGS. 1 and 2, the secondary battery includes the outer package film 10, the battery device 20, a positive electrode lead 31, a negative electrode lead 32, and sealing films 41 and 42. The secondary battery described here is a secondary battery of a laminated-film type in which the outer package film 10 having flexibility or softness is used.

As illustrated in FIG. 1, the outer package film 10 is a flexible outer package member that contains the battery device 20. The battery device 20 is sealed in a state of being contained inside the outer package film 10. That is, the outer package film 10 has a pouch-shaped structure, and contains a positive electrode 21, a negative electrode 22, and an electrolytic solution that are to be described later.

Here, the outer package film 10 is a single film-shaped member and is foldable toward a direction F. The outer package film 10 has a depression part 10U to place the battery device 20 therein. The depression part 10U is a so-called deep drawn part.

For example, the outer package film 10 is a three-layered laminated film including a fusion-bonding layer, a metal layer, and a surface protective layer that are stacked in this order from an inner side. In a state in which the outer package film 10 is folded, outer edge parts of the fusion-bonding layer opposed to each other are fusion-bonded to each other. The fusion-bonding layer includes a polymer compound such as polypropylene. The metal layer includes a metal material such as aluminum. The surface protective layer includes a polymer compound such as nylon.

Note that the outer package film 10 is not particularly limited in configuration or the number of layers, and may be single-layered or two-layered, or may include four or more layers. Further, in a case where the outer package film 10 is a multilayered laminated film, a material included in each layer may be selected as desired.

The sealing film 41 is interposed between the outer package film 10 and the positive electrode lead 31. The sealing film 42 is interposed between the outer package film 10 and the negative electrode lead 32. Note that the sealing film 41, the sealing film 42, or both may be omitted.

The sealing film 41 is a sealing member that prevents entry, for example, of outside air into the outer package film 10. The sealing film 41 includes a polymer compound such as a polyolefin that has adherence to the positive electrode lead 31. Examples of the polyolefin include polypropylene.

A configuration of the sealing film 42 is similar to that of the sealing film 41 except that the sealing film 42 is a sealing member that has adherence to the negative electrode lead 32. That is, the sealing film 42 includes a polymer compound such as a polyolefin that has adherence to the negative electrode lead 32.

As illustrated in FIGS. 1 and 2, the battery device 20 is a power generation device that includes the positive electrode 21, the negative electrode 22, a separator 23, and the electrolytic solution (not illustrated). The battery device 20 is contained inside the outer package film 10.

Here, the battery device 20 is a so-called wound electrode body. That is, in the battery device 20, the positive electrode 21 and the negative electrode 22 are stacked on each other with the separator 23 interposed therebetween, and the positive electrode 21, the negative electrode 22, and the separator 23 are wound about a virtual axis extending in a Y-axis direction, that is, a winding axis P. Thus, the positive electrode 21 and the negative electrode 22 are opposed to each other with the separator 23 interposed therebetween, and are wound.

A three-dimensional shape of the battery device 20 is not particularly limited. Here, the battery device 20 has an elongated shape. Accordingly, a section of the battery device 20 intersecting the winding axis P, that is, a section of the battery device 20 along the XZ plane, has an elongated shape defined by a major axis J1 and a minor axis J2. The major axis J1 is a virtual axis that extends in an X-axis direction and has a larger length than the minor axis J2. The minor axis J2 is a virtual axis that extends in a Z-axis direction intersecting the X-axis direction and has a smaller length than the major axis J1. Here, the battery device 20 has an elongated cylindrical three-dimensional shape. Thus, the section of the battery device 20 has an elongated, substantially elliptical shape.

The positive electrode 21 includes, as illustrated in FIG. 2, a positive electrode current collector 21A and a positive electrode active material layer 21B.

The positive electrode current collector 21A has two opposed surfaces on which the respective positive electrode active material layers 21B are to be provided, and supports the positive electrode active material layers 21B. The positive electrode current collector 21A includes an electrically conductive material such as a metal material. Examples of the metal material include aluminum.

Here, the positive electrode active material layer 21B is provided on each of the two opposed surfaces of the positive electrode current collector 21A. The positive electrode active material layer 21B includes one or more of positive electrode active materials into which lithium is insertable and from which lithium is extractable. Note that the positive electrode active material layer 21B may be provided only on one of the two opposed surfaces of the positive electrode current collector 21A. Further, the positive electrode active material layer 21B may further include one or more of other materials including, without limitation, a positive electrode binder and a positive electrode conductor. A method of forming the positive electrode active material layer 21B is not particularly limited, and specifically includes one or more of methods including, without limitation, a coating method.

The positive electrode active material is not particularly limited in kind, and specific examples thereof include a lithium-containing compound. The lithium-containing compound is a compound including lithium and one or more transition metal elements as constituent elements. The lithium-containing compound may further include one or more other elements as one or more constituent elements. The one or more other elements are not particularly limited in kind as long as the one or more other elements are each an element other than lithium and the transition metal elements. For example, the one or more other elements are any one or more of elements belonging to groups 2 to 15 in the long period periodic table of elements. The lithium-containing compound is not particularly limited in kind, and specific examples thereof include an oxide, a phosphoric acid compound, a silicic acid compound, and a boric acid compound.

Specific examples of the oxide include $LiNiO_2$, $LiCoO_2$, $LiCo_{0.98}Al_{0.01}Mg_{0.01}O_2$, $LiNi_{0.5}MCo_{0.2}Mn_{0.3}O_2$, $LiNi_{0.5}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, $Li_{1.15}(Mn_{0.65}Ni_{0.22}Co_{0.13})O_2$, and $LiMn_2O_4$. Specific examples of the phosphoric acid compound include $LiFePO_4$, $LiMnPO_4$, $LiFe_{0.5}Mn_{0.5}PO_4$, and $LiFe_{0.3}Mn_{0.7}PO_4$.

The positive electrode binder includes one or more of materials including, without limitation, a synthetic rubber and a polymer compound. Examples of the synthetic rubber include a styrene-butadiene-based rubber, a fluorine-based rubber, and ethylene propylene diene. Examples of the polymer compound include polyvinylidene difluoride, polyimide, and carboxymethyl cellulose.

The positive electrode conductor includes one or more of electrically conductive materials including, without limitation, a carbon material. Examples of the carbon material include graphite, carbon black, acetylene black, and Ketjen black. The electrically conductive material may be a metal material or a polymer compound, for example.

The negative electrode 22 includes, as illustrated in FIG. 2, a negative electrode current collector 22A, a negative electrode active material layer 22B, and a film 22C.

The negative electrode current collector 22A has two opposed surfaces on which the respective negative electrode active material layers 22B are to be provided, and supports the negative electrode active material layers 22B. The negative electrode current collector 22A includes an electrically conductive material such as a metal material. Examples of the metal material include copper.

Here, the negative electrode active material layer 22B is provided on each of the two opposed surfaces of the negative electrode current collector 22A. The negative electrode active material layer 22B includes one or more of negative electrode active materials into which lithium is insertable and from which lithium is extractable. Note that the negative electrode active material layer 22B may be provided only on one of the two opposed surfaces of the negative electrode current collector 22A. Further, the negative electrode active material layer 22B may further include one or more of materials including, without limitation, a negative electrode binder and a negative electrode conductor. A method of forming the negative electrode active material layer 22B is not particularly limited, and specifically includes one or more of methods including, without limitation, a coating method, a vapor-phase method, a liquid-phase method, a thermal spraying method, and a firing (sintering) method.

The negative electrode active material is not particularly limited in kind, and specifically includes a carbon material, a metal-based material, or both, for example. A reason for this is that a high energy density is obtainable. Specific examples of the carbon material include graphitizable carbon, non-graphitizable carbon, and graphite (natural graphite and artificial graphite). The metal-based material is a material that includes, as one or more constituent elements, one or more elements among metal elements and metalloid elements that are each able to form an alloy with lithium. Specifically, the metal-based material includes, for example, silicon, tin, or both as one or more constituent elements. The metal-based material may be a simple substance, an alloy, a compound, a mixture of two or more thereof, or a material including two or more phases thereof. Specific examples of the metal-based material include $TiSi_2$ and $SiO_x$ ($0<x\leq 2$ or $0.2<x<1.4$).

Details of the negative electrode binder are similar to those of the positive electrode binder. Details of the negative electrode conductor are similar to those of the positive electrode conductor.

The film 22C covers a surface of the negative electrode active material layer 22B. In this case, the film 22C may cover the entire surface of the negative electrode active material layer 22B, or may cover only a portion of the surface of the negative electrode active material layer 22B. In the latter case, multiple films 22C may cover the surface of the negative electrode active material layer 22B at respective locations separate from each other. FIG. 2 illustrates a case where the film 22C covers the entire surface of the negative electrode active material layer 22B.

As will be described later, the film 22C is formed on the surface of each of the negative electrode active material layers 22B through a stabilization process (a first charge and discharge process) on the secondary battery after being assembled in a process of manufacturing the secondary battery, and includes sulfur and oxygen as constituent elements.

Here, as will be described later, the electrolytic solution includes a first sulfur-containing compound and a second sulfur-containing compound. Thus, each of the first sulfur-containing compound and the second sulfur-containing compound included in the electrolytic solution decomposes and reacts upon the stabilization process. The film 22C therefore includes, as constituent elements, sulfur and oxygen derived from the first sulfur-containing compound and the second sulfur-containing compound. Each of the first sulfur-containing compound and the second sulfur-containing compound is a compound including sulfur as a constituent element, and is a substance to be a source of sulfur. Details of the first sulfur-containing compound and details of the second sulfur-containing compound will be described later.

In the secondary battery, a predetermined physical property condition is satisfied regarding the film 22C, in order to improve each of a battery capacity characteristic, a swelling characteristic, and an electric resistance characteristic. Details of the physical property of the film 22C will be described later.

The separator 23 is an insulating porous film interposed between the positive electrode 21 and the negative electrode 22 as illustrated in FIG. 2, and allows lithium ions to pass therethrough while preventing contact (a short circuit) between the positive electrode 21 and the negative electrode 22. The separator 23 includes a polymer compound such as polyethylene.

The positive electrode 21, the negative electrode 22, and the separator 23 are each impregnated with the electrolytic solution. The electrolytic solution includes a solvent and an electrolyte salt.

The solvent includes one or more of non-aqueous solvents (organic solvents), and the electrolytic solution including the non-aqueous solvent(s) is a so-called non-aqueous electrolytic solution.

The non-aqueous solvent includes, for example, an ester or an ether, more specifically, a carbonic-acid-ester-based compound, a carboxylic-acid-ester-based compound, or a lactone-based compound, for example.

The carbonic-acid-ester-based compound is a cyclic carbonic acid ester or a chain carbonic acid ester, for example. Specific examples of the cyclic carbonic acid ester include ethylene carbonate and propylene carbonate, and specific examples of the chain carbonic acid ester include dimethyl carbonate, diethyl carbonate, and methyl ethyl carbonate. The carboxylic-acid-ester-based compound is a chain carboxylic acid ester, for example. Specific examples of the chain carboxylic acid ester include ethyl acetate, propyl acetate, ethyl propionate, propyl propionate, and ethyl trimethylacetate. The lactone-based compound is a lactone, for example. Specific examples of the lactone include γ-butyrolactone and γ-valerolactone. Note that the ether may be the lactone-based compound described above, 1,2-dimethoxyethane, tetrahydrofuran, 1,3-dioxolane, or 1,4-dioxane, for example.

Further, the non-aqueous solvent may include one or more of materials including, without limitation, an unsaturated cyclic carbonic acid ester, a halogenated carbonic acid ester, a phosphoric acid ester, an acid anhydride, a nitrile compound, and an isocyanate compound. A reason for this is that chemical stability of the electrolytic solution improves.

Specific examples of the unsaturated cyclic carbonic acid ester include vinylene carbonate (1,3-dioxol-2-one), vinylethylene carbonate (4-vinyl-1,3-dioxolane-2-one), and methylene ethylene carbonate (4-methylene-1,3-dioxolane-2-one). Specific examples of the halogenated carbonic acid ester include fluoroethylene carbonate (4-fluoro-1,3-dioxolane-2-one) and difluoroethylene carbonate (4,5-difluoro-1,3-dioxolane-2-one). Specific examples of the phosphoric acid ester include trimethyl phosphate and triethyl phosphate.

The acid anhydride is a cyclic dicarboxylic acid anhydride or a cyclic carboxylic acid sulfonic acid anhydride, for example. Specific examples of the cyclic dicarboxylic acid anhydride include succinic anhydride, glutaric anhydride, and maleic anhydride. Specific examples of the cyclic carboxylic acid sulfonic acid anhydride include sulfobenzoic anhydride, sulfopropionic anhydride, and sulfobutyric anhydride.

Specific examples of the nitrile compound include acetonitrile, succinonitrile, and adiponitrile. Specific examples of the isocyanate compound include hexamethylene diisocyanate.

The electrolyte salt includes one or more of light metal salts including, without limitation, a lithium salt. Specific examples of the lithium salt include lithium hexafluorophosphate ($LiPF_6$), lithium tetrafluoroborate ($LiBF_4$), lithium trifluoromethanesulfonate ($LiCF_3SO_3$), lithium bis(fluorosulfonyl)imide ($LiN(FSO_2)_2$), lithium bis(trifluoromethanesulfonyl)imide ($LiN(CF_3SO_2)_2$), lithium tris(trifluoromethanesulfonyl)methide ($LiC(CF_3SO_2)_3$), and lithium bis(oxalato)borate ($LiB(C_2O_4)_2$).

A content of the electrolyte salt is not particularly limited, and is specifically within a range from 0.3 mol/kg to 3.0 mol/kg both inclusive with respect to the solvent. A reason for this is that high ion conductivity is obtainable.

Note that the electrolytic solution may include the first sulfur-containing compound and the second sulfur-containing compound. The first sulfur-containing compound includes one or more of respective compounds represented by Formulae (1) to (11). The second sulfur-containing compound includes a compound represented by Formula (12), a compound represented by Formula (13), or both.

A reason why the electrolytic solution includes the first sulfur-containing compound and the second sulfur-containing compound together is that it becomes easier to form, on the surface of the negative electrode active material layer 22B, the film 22C that includes sulfur and oxygen as constituent elements owing to the decomposition and the reaction of each of the first sulfur-containing compound and the second sulfur-containing compound upon the stabilization process of the secondary battery. Further, even if a portion of the film 22C is decomposed upon charging and discharging, it becomes easier to additionally form the film 22C owing to decomposition and a reaction of each of the first sulfur-containing compound and the second sulfur-containing compound at a subsequent cycle of charging and discharging.

[Chem. 1]

(1)

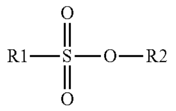

(2)

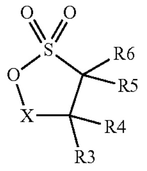

(3)

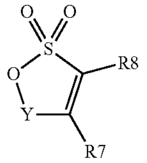

(4)

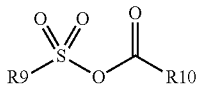

(5)

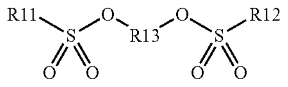

(6)

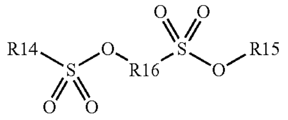

(7)

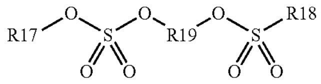

(8)

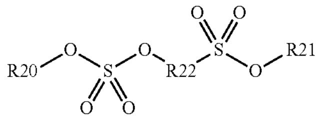

(9)

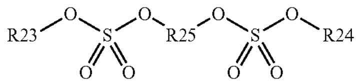

(10)

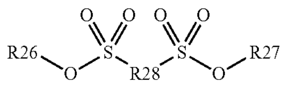

(11)

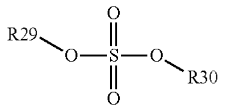

Where:

R1 is one of an alkyl group or a hydroxyalkyl group;

R2 is one of a hydrogen group or an alkyl group;

each of R3 to R6 is one of a hydrogen group, an alkyl group, an alkoxy group, a halogenated alkyl group, or a halogenated alkoxy group;

X is an alkylene group;

each of R7 and R8 is one of a hydrogen group, an alkyl group, an alkenyl group, an alkoxy group, a halogenated alkyl group, a halogenated alkenyl group, or a halogenated alkoxy group;

Y is an alkylene group;

each of R9 and R10 is one of a hydrogen group, an alkyl group, or an alkenyl group;

R9 and R10 are optionally bonded to each other;

each of R11 and R12 is one of a hydrogen group or an alkyl group;

R13 is an alkylene group;

R11 and R12 are optionally bonded to each other;

each of R14 and R15 is one of a hydrogen group or an alkyl group;

R16 is an alkylene group;

R14 and R15 are optionally bonded to each other;

each of R17 and R18 is one of a hydrogen group or an alkyl group;

R19 is an alkylene group;

R17 and R18 are optionally bonded to each other;

each of R20 and R21 is one of a hydrogen group or an alkyl group;

R22 is an alkylene group;

R20 and R21 are optionally bonded to each other;

each of R23 and R24 is one of a hydrogen group or an alkyl group;

R25 is an alkylene group;

R23 and R24 are optionally bonded to each other;

each of R26 and R27 is one of a hydrogen group or an alkyl group;

R28 is an alkylene group;

R26 and R27 are optionally bonded to each other; and each of R29 and R30 is one of a hydrogen group, an alkyl group, or a hydroxyalkyl group.

[Chem. 2]

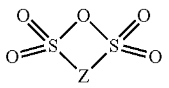

(12)

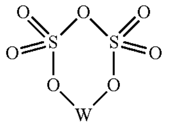

(13)

Where each of Z and W is one of an alkylene group or an alkenylene group.

As described above, each of the first sulfur-containing compound and the second sulfur-containing compound is a substance to be a source of sulfur, that is, a compound including sulfur as a constituent element. Only one first sulfur-containing compound may be used, or two or more first sulfur-containing compounds may be used. Only one second sulfur-containing compound may be used, or two or more second sulfur-containing compounds may be used.

The compound represented by Formula (1) which is the first kind of first sulfur-containing compound is a chain compound having one sulfo-type group ($-S(=O)_2-O-$). R1 is not particularly limited as long as R1 is one of an alkyl group or a hydroxyalkyl group. R2 is not particularly limited as long as R2 is one of a hydrogen group or an alkyl group.

The alkyl group may have: a straight-chain structure; or a branched structure having one or more side chains. Carbon number of the alkyl group is not particularly limited. Specific examples of the alkyl group include a methyl group, an ethyl group, a propyl group, and a butyl group.

The hydroxyalkyl group is a group resulting from substituting a hydrogen group at a terminal of the alkyl group described above with a hydroxyl group ($-OH$). Specific examples of the hydroxyalkyl group include a hydroxymethyl group, a hydroxyethyl group, a hydroxypropyl group, and a hydroxybutyl group.

The compound represented by Formula (2) which is the second kind of first sulfur-containing compound is a cyclic compound having a structure of a propane sultone (1,3-propane sultone) type. Each of R3 to R6 is not particularly limited as long as each of R3 to R6 is one of a hydrogen group, an alkyl group, an alkoxy group, a halogenated alkyl group, or a halogenated alkoxy group. X is not particularly limited as long as X is an alkylene group.

The alkoxy group may have: a straight-chain structure; or a branched structure having one or more side chains. Carbon number of the alkoxy group is not particularly limited. Specific examples of the alkoxy group include a methoxy group, an ethoxy group, a propoxy group, and a butoxy group.

The halogenated alkyl group is a group resulting from substituting one or more hydrogen groups of the alkyl group described above with one or more halogen groups. The halogenated alkoxy group is a group resulting from substituting one or more hydrogen groups of the alkoxy group described above with one or more halogen groups.

The halogen group is not particularly limited in kind, and specific examples thereof include a fluorine group, a chlorine group, a bromine group, and an iodine group.

The alkylene group may have: a straight-chain structure; or a branched structure having one or more side chains. Carbon number of the alkylene group is not particularly limited. Specific examples of the alkylene group include a methylene group, an ethylene group, a propylene group, and a butylene group.

The compound represented by Formula (3) which is the third kind of first sulfur-containing compound is a cyclic compound having a structure of a propene sultone (1-propene 1,3-sultone) type. Each of R7 and R8 is not particularly limited as long as each of R7 and R8 is one of a hydrogen group, an alkyl group, an alkenyl group, an alkoxy group, a halogenated alkyl group, a halogenated alkenyl group, or a halogenated alkoxy group. Details of each of the alkyl group, the alkoxy group, the halogenated alkyl group, and the halogenated alkoxy group are as described above. Y is not particularly limited as long as Y is an alkylene group.

The alkenyl group may have: a straight-chain structure; or a branched structure having one or more side chains. Carbon number of the alkenyl group is not particularly limited. Specific examples of the alkenyl group include a vinyl group and an allyl group. The halogenated alkenyl group is a group resulting from substituting one or more hydrogen groups of the alkenyl group described above with one or more halogen groups. Details of the halogen group are as described above.

The compound represented by Formula (4) which is the fourth kind of first sulfur-containing compound is a chain or cyclic compound having one sulfo-type group and one carbonyl group ($-C(=O)-$). Each of R9 and R10 is not particularly limited as long as each of R9 and R10 is one of a hydrogen group, an alkyl group, or an alkenyl group. Note that R9 and R10 may be bonded to each other as described above.

The compound represented by Formula (5) which is the fifth kind of first sulfur-containing compound is a chain or cyclic compound having two sulfo-type groups arranged in a bilaterally symmetric configuration. Each of R11 and R12 is not particularly limited as long as each of R11 and R12 is one of a hydrogen group or an alkyl group. R13 is not particularly limited as long as R13 is an alkylene group. Note that R11 and R12 may be bonded to each other as described above.

The compound represented by Formula (6) which is the sixth kind of first sulfur-containing compound is a chain or cyclic compound having two sulfo-type groups arranged in a bilaterally asymmetric configuration. Each of R14 and R15 is not particularly limited as long as each of R14 and R15 is one of a hydrogen group or an alkyl group. R16 is not particularly limited as long as R16 is an alkylene group. Note that R14 and R15 may be bonded to each other as described above.

The compound represented by Formula (7) which is the seventh kind of first sulfur-containing compound is a chain or cyclic compound having one sulfuric-acid-type group ($-O-S(=O)_2-O-$) and one sulfo-type group. Each of R17 and R18 is not particularly limited as long as each of R17 and R18 is one of a hydrogen group or an alkyl group. R19 is not particularly limited as long as R19 is an alkylene group. Note that R17 and R18 may be bonded to each other as described above.

The compound represented by Formula (8) which is the eighth kind of first sulfur-containing compound is a chain or cyclic compound having one sulfuric-acid-type group and one sulfo-type group. Each of R20 and R21 is not particularly limited as long as each of R20 and R21 is one of a hydrogen group or an alkyl group. R22 is not particularly limited as long as R22 is an alkylene group. Note that R20 and R21 may be bonded to each other as described above.

The compound represented by Formula (9) which is the ninth kind of first sulfur-containing compound is a chain or cyclic compound having two sulfuric-acid-type groups. Each of R23 and R24 is not particularly limited as long as each of R23 and R24 is one of a hydrogen group or an alkyl group. R25 is not particularly limited as long as R25 is an alkylene group. Note that R23 and R24 may be bonded to each other as described above.

The compound represented by Formula (10) which is the tenth kind of first sulfur-containing compound is a chain or cyclic compound having two sulfo-type groups arranged in a bilaterally symmetric configuration. Each of R26 and R27 is not particularly limited as long as each of R26 and R27 is one of a hydrogen group or an alkyl group. R28 is not particularly limited as long as R28 is an alkylene group. Note that R26 and R27 may be bonded to each other as described above.

The compound represented by Formula (11) which is the eleventh kind of first sulfur-containing compound is a chain compound having one sulfuric-acid-type group. Each of R29 and R30 is not particularly limited as long as each of R29 and R30 is one of a hydrogen group, an alkyl group, or a hydroxyalkyl group.

The compound represented by Formula (12) which is the first kind of second sulfur-containing compound is a cyclic compound having a disulfonic-anhydride-type structure. Z is not particularly limited as long as Z is one of an alkylene group or an alkenylene group.

The alkenylene group may have: a straight-chain structure; or a branched structure having one or more side chains. Carbon number of the alkenylene group is not particularly limited. Specific examples of the alkenylene group include a vinylene group and an allylene group.

The compound represented by Formula (13) which is the second kind of second sulfur-containing compound is a cyclic compound having a disulfuric-anhydride-type structure. W is not particularly limited as long as W is one of an alkylene group or an alkenylene group. Details of the alkenylene group are as described above.

Specific examples of the first sulfur-containing compound and specific examples of the second sulfur-containing compound are as described below. A reason for this is that it becomes sufficiently easier to form the film 22C on the surface of the negative electrode active material layer 22B.

Specific examples of the compound represented by Formula (1) which is the first kind of first sulfur-containing compound include respective compounds represented by Formulae (1-1) and (1-2).

[Chem. 3]

(1-1)

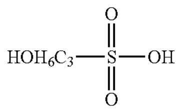

(1-2)

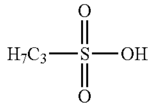

Specific examples of the compound represented by Formula (2) which is the second kind of first sulfur-containing compound include respective compounds represented by Formulae (2-1) to (2-5).

[Chem. 4]

(2-1)

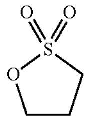

(2-2)

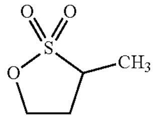

(2-3)

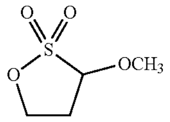

(2-4)

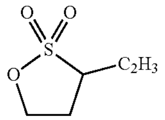

(2-5)

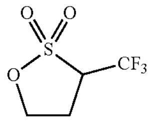

Specific examples of the compound represented by Formula (3) which is the third kind of first sulfur-containing compound include respective compounds represented by Formulae (3-1) to (3-7).

[Chem. 5]

(3-1)

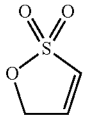

(3-2)

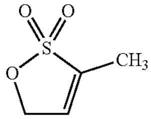

(3-3)

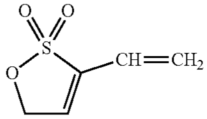

(3-4)

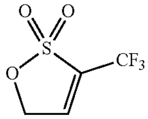

(3-5)

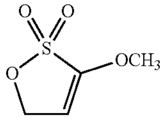

(3-6)

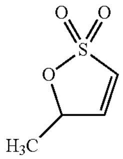

(3-7)

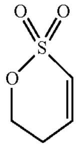

Specific examples of the compound represented by Formula (4) which is the fourth kind of first sulfur-containing compound include respective compounds represented by Formulae (4-1) to (4-8).

[Chem. 6]

(4-1)

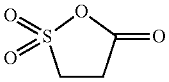

(4-2)

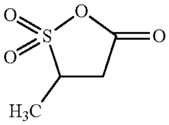

-continued (4-3)

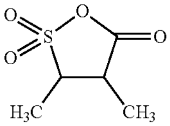

(4-4)

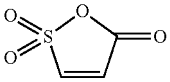

(4-5)

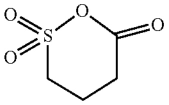

(4-6)

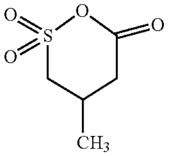

(4-7)

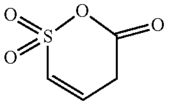

(4-8)

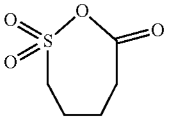

Specific examples of the compound represented by Formula (5) which is the fifth kind of first sulfur-containing compound include respective compounds represented by Formulae (5-1) to (5-7).

[Chem. 7]

(5-1)

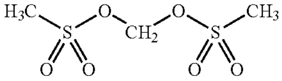

(5-2)

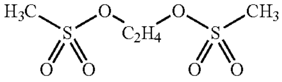

(5-3)

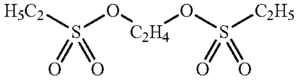

(5-4)

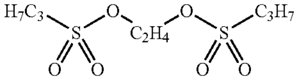

(5-5)

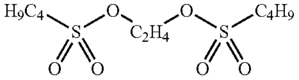

(5-6)

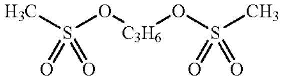

-continued (5-7)

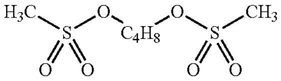

Specific examples of the compound represented by Formula (6) which is the sixth kind of first sulfur-containing compound include respective compounds represented by Formulae (6-1) to (6-8).

[Chem. 8]

(6-1)

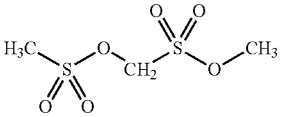

(6-2)

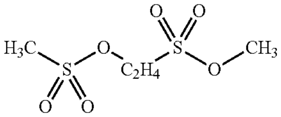

(6-3)

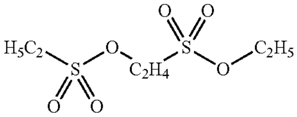

(6-4)

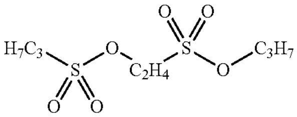

(6-5)

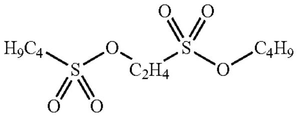

(6-6)

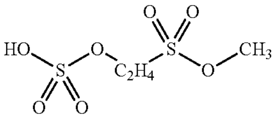

(6-7)

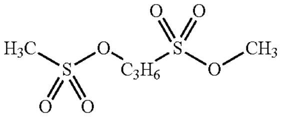

(6-8)

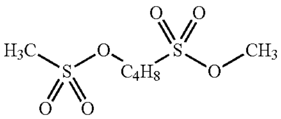

Specific examples of the compound represented by Formula (7) which is the seventh kind of first sulfur-containing compound include respective compounds represented by Formulae (7-1) to (7-8).

[Chem. 9]

(7-1)

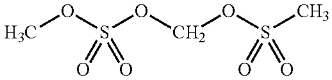

(7-2)

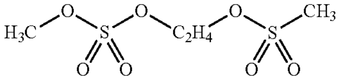

(7-3)

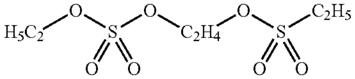

(7-4)

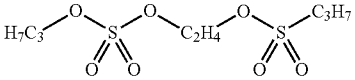

(7-5)

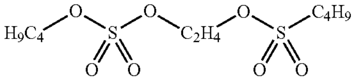

(7-6)

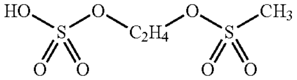

(7-7)

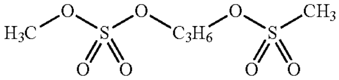

(7-8)

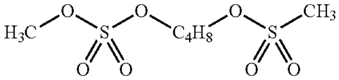

Specific examples of the compound represented by Formula (8) which is the eighth kind of first sulfur-containing compound include respective compounds represented by Formulae (8-1) to (8-8).

[Chem. 10]

(8-1)

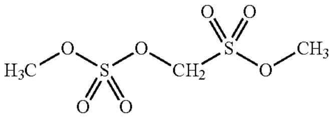

(8-2)

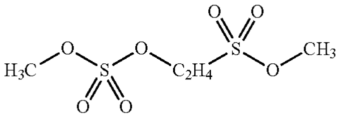

(8-3)

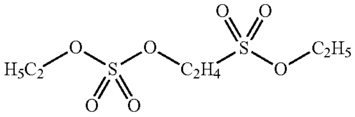

(8-4)

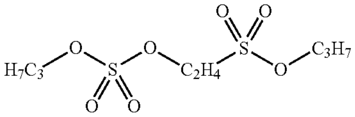

-continued (8-5)

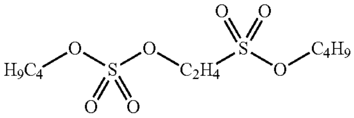

(8-6)

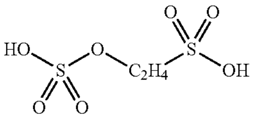

(8-7)

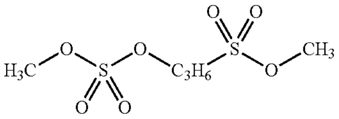

(8-8)

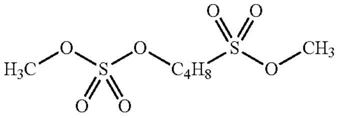

Specific examples of the compound represented by Formula (9) which is the ninth kind of first sulfur-containing compound include respective compounds represented by Formulae (9-1) to (9-8).

[Chem. 11]

(9-1)

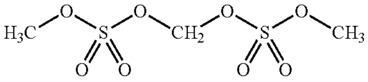

(9-2)

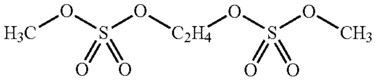

(9-3)

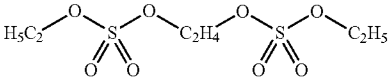

(9-4)

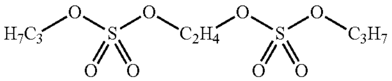

(9-5)

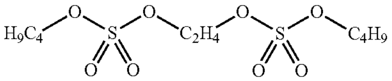

(9-6)

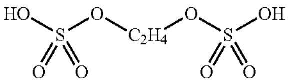

(9-7)

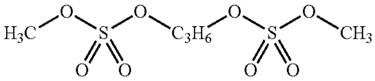

(9-8)

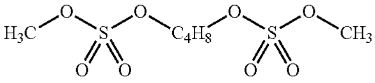

Specific examples of the compound represented by Formula (10) which is the tenth kind of first sulfur-containing compound include respective compounds represented by Formulae (10-1) to (10-8).

[Chem. 12]

(10-1)

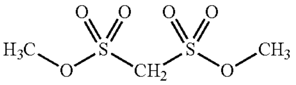

(10-2)

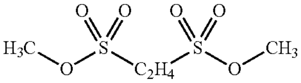

(10-3)

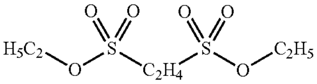

(10-4)

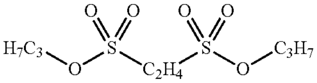

(10-5)

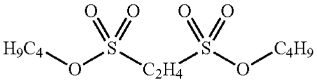

(10-6)

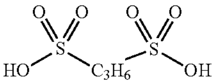

(10-7)

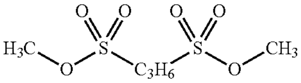

(10-8)

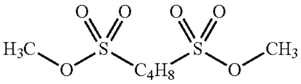

Specific examples of the compound represented by Formula (11) which is the eleventh kind of first sulfur-containing compound include respective compounds represented by Formulae (11-1) and (11-2).

[Chem. 13]

(11-1)

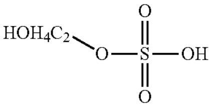

(11-2)

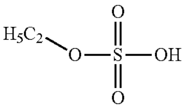

Specific examples of the compound represented by Formula (12) which is the first kind of second sulfur-containing compound include respective compounds represented by Formulae (12-1) to (12-8).

[Chem. 14]

(12-1)

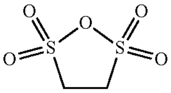

-continued (12-2)

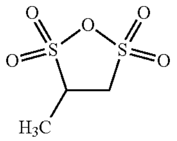

(12-3)

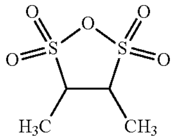

(12-4)

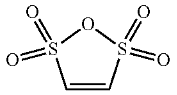

(12-5)

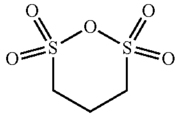

(12-6)

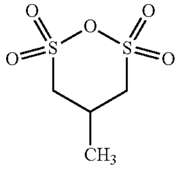

(12-7)

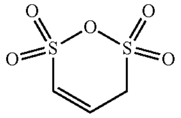

(12-8)

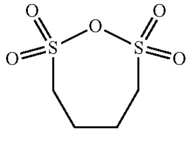

Specific examples of the compound represented by Formula (13) which is the second kind of second sulfur-containing compound include respective compounds represented by Formulae (13-1) to (13-5).

[Chem. 15]

(13-1)

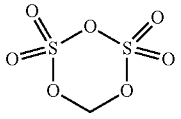

(13-2)

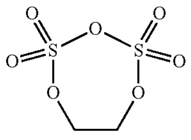

-continued (13-3)

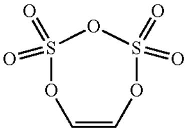

(13-4)

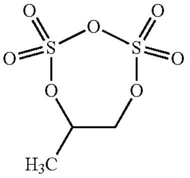

(13-5)

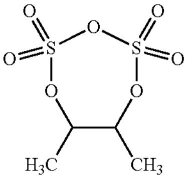

A content of the first sulfur-containing compound in the electrolytic solution is not particularly limited, and is specifically within a range from 0.001 wt % to 2.0 wt % both inclusive. A reason for this is that it becomes sufficiently easier to form the film 22C on the surface of the negative electrode active material layer 22B.

A content of the second sulfur-containing compound in the electrolytic solution is not particularly limited, and is specifically within a range from 0.001 wt % to 2.0 wt % both inclusive. A reason for this is that it becomes sufficiently easier to form the film 22C on the surface of the negative electrode active material layer 22B.

As illustrated in FIG. 1, the positive electrode lead 31 is a positive electrode wiring line coupled to the battery device 20 (the positive electrode 21), and is led from an inside to an outside of the outer package film 10. The positive electrode lead 31 includes an electrically conductive material such as aluminum. The positive electrode lead 31 has a shape such as a thin plate shape or a meshed shape.

As illustrated in FIG. 1, the negative electrode lead 32 is a negative electrode wiring line coupled to the battery device 20 (the negative electrode 22). Here, the negative electrode lead 32 is led from the inside to the outside of the outer package film 10 toward a direction similar to that in which the positive electrode lead 31 is led out. The negative electrode lead 32 includes an electrically conductive material such as copper. Details of a shape of the negative electrode lead 32 are similar to those of the shape of the positive electrode lead 31.

In the secondary battery, as described above, the predetermined physical property condition is satisfied regarding the film 22C that includes sulfur and oxygen as constituent elements, in order to improve each of the battery capacity characteristic, the swelling characteristic, and the electric resistance characteristic.

Based on a negative ion analysis of the film 22C by time-of-flight secondary ion mass spectrometry (TOF-SIMS), a first peak derived from $SO^{2-}$ and a second peak derived from $S^-$ are detectable. In this case, an intensity ratio R (=I2/I1) which is a ratio of an intensity I2 of the second peak to an intensity I1 of the first peak is within a range from 0.100 to 0.250 both inclusive. Note that a value of the intensity ratio R is rounded off to three decimal places.

A reason why the above-described physical property condition (the intensity ratio R within the range from 0.100 to 0.250 both inclusive) is satisfied is that a composition of the film 22C including sulfur and oxygen as constituent elements is made appropriate, which appropriately increases a density of the film 22C. Thus, a favorable film 22C that is thin but has high durability is formed on the surface of the negative electrode active material layer 22B. This suppresses a decomposition reaction of the electrolytic solution on a surface of the negative electrode 22, while suppressing an increase in electric resistance and securing insertion and extraction of lithium in the negative electrode 22 (the negative electrode active material layer 22B).

Note that, in the case of performing the negative ion analysis of the film 22C by TOF-SIMS, TOF-SIMS5, a TOF-SIMS spectrometer available from IONTOF, for example, is usable. Analysis conditions are as follows. Primary ion species: $Bi^{3+}$; primary ion acceleration voltage: 25 kV; peak width: 15.2 ns; primary ion current: less than or equal to 0.3 pA; and scan range: 200 μm×200 μm.

As will be described later, the intensities I1 and I2 are each varied by changing conditions in a case of performing the stabilization process on the secondary battery, and the intensity ratio R is accordingly adjustable to a desired value. Examples of the conditions in the case of performing the stabilization process on the secondary battery include an environmental temperature and a current at the time of charging.

The secondary battery operates as described below. Upon charging, in the battery device 20, lithium is extracted from the positive electrode 21, and the extracted lithium is inserted into the negative electrode 22 via the electrolytic solution. Upon discharging, in the battery device 20, lithium is extracted from the negative electrode 22, and the extracted lithium is inserted into the positive electrode 21 via the electrolytic solution. Upon charging and discharging, lithium is inserted and extracted in an ionic state.

The secondary battery is manufactured according to a procedure to be described below according to an embodiment. In this case, as will be described later, the secondary battery is assembled using the positive electrode 21, a negative electrode precursor, and the electrolytic solution, following which the stabilization process is performed on the secondary battery.

First, the positive electrode active material is mixed with materials including, without limitation, the positive electrode binder and the positive electrode conductor on an as-needed basis to thereby obtain a positive electrode mixture. Thereafter, the positive electrode mixture is put into a solvent to thereby prepare a paste positive electrode mixture slurry. The solvent may be an aqueous solvent, or may be a non-aqueous solvent (an organic solvent). Lastly, the positive electrode mixture slurry is applied on the two opposed surfaces of the positive electrode current collector 21A to thereby form the positive electrode active material layers 21B. Thereafter, the positive electrode active material layers 21B may be compression-molded by means of, for example, a roll pressing machine. In this case, the positive electrode active material layers 21B may be heated. The positive electrode active material layers 21B may be compression-molded multiple times. In this manner, the positive electrode active material layers 21B are formed on the respective two opposed surfaces of the positive electrode current collector 21A. Thus, the positive electrode 21 is fabricated.

The negative electrode active material layers 22B are formed on the respective two opposed surfaces of the negative electrode current collector 22A by a procedure similar to the fabrication procedure of the positive electrode 21 described above. Specifically, first, the negative electrode active material is mixed with materials including, without limitation, the negative electrode binder and the negative electrode conductor on an as-needed basis to thereby obtain a negative electrode mixture. Thereafter, the negative electrode mixture is put into a solvent to thereby prepare a paste negative electrode mixture slurry. Details of the solvent are as described above. Thereafter, the negative electrode mixture slurry is applied on the two opposed surfaces of the negative electrode current collector 22A to thereby form the negative electrode active material layers 22B. Thereafter, the negative electrode active material layers 22B may be compression-molded. In this manner, the negative electrode active material layers 22B are formed on the respective two opposed surfaces of the negative electrode current collector 22A. Thus, the negative electrode precursor (not illustrated) is fabricated.

Lastly, as will be described later, the secondary battery is assembled using the negative electrode precursor, following which the stabilization process is performed on the secondary battery. As a result, the film 22C including sulfur and oxygen as constituent elements is formed on the surface of each of the negative electrode active material layers 22B. In this manner, the negative electrode active material layers 22B and the films 22C are formed on the respective two opposed surfaces of the negative electrode current collector 22A. Thus, the negative electrode 22 is fabricated.

The electrolyte salt is put into the solvent, following which the first sulfur-containing compound and the second sulfur-containing compound are added to the solvent. The electrolyte salt, the first sulfur-containing compound, and the second sulfur-containing compound are thereby each dispersed or dissolved in the solvent. As a result, the electrolytic solution is prepared.

First, the positive electrode lead 31 is coupled to the positive electrode 21 (the positive electrode current collector 21A) by a method such as a welding method, and the negative electrode lead 32 is coupled to the negative electrode 22 (the negative electrode current collector 22A) by a method such as a welding method.

Thereafter, the positive electrode 21 and the negative electrode precursor are stacked on each other with the separator 23 interposed therebetween, following which the stack of the positive electrode 21, the negative electrode precursor, and the separator 23 is wound to thereby fabricate a wound body (not illustrated). The wound body has a configuration similar to that of the battery device 20 except that the wound body includes the negative electrode precursor instead of the negative electrode 22, and that the positive electrode 21, the negative electrode precursor, and the separator 23 are each not impregnated with the electrolytic solution. Thereafter, the wound body is pressed by means of, for example, a pressing machine to thereby shape the wound body into an elongated shape.

Thereafter, the wound body is placed inside the depression part 10U, following which the outer package film 10 (the fusion-bonding layer/the metal layer/the surface protective layer) is folded to thereby cause portions of the outer package film 10 to be opposed to each other. Thereafter, outer edge parts of two sides of the outer package film 10 (the fusion-bonding layer) opposed to each other are fusion-bonded to each other by a method such as a thermal-fusion-bonding method to thereby contain the wound body in the outer package film 10 having the pouch shape.

Lastly, the electrolytic solution is injected into the outer package film 10 having the pouch shape, following which outer edge parts of the remaining one side of the outer package film 10 (the fusion-bonding layer) are fusion-bonded to each other by a method such as a thermal-fusion-bonding method. In this case, the sealing film 41 is interposed between the outer package film 10 and the positive electrode lead 31, and the sealing film 42 is interposed between the outer package film 10 and the negative electrode lead 32. In this manner, the wound body is impregnated with the electrolytic solution, and the wound body is sealed in the outer package film 10 having the pouch shape. As a result, the secondary battery is assembled.

The assembled secondary battery is charged and discharged. As a result, each of the first sulfur-containing compound and the second sulfur-containing compound included in the electrolytic solution decomposes and reacts, and the film 22C including sulfur and oxygen as constituent elements is thus formed on the surface of each of the negative electrode active material layers 22B. In this manner, the negative electrode active material layers 22B and the films 22C are formed on the respective two opposed surfaces of the negative electrode current collector 22A. Thus, the negative electrode 22 is fabricated. As a result, the battery device 20 is fabricated.

This brings the secondary battery into an electrochemically stable state. Thus, the secondary battery including the outer package film 10, that is, the secondary battery of the laminated-film type, is completed.

In the case of stabilizing the secondary battery, that is, charging and discharging the secondary battery, the environmental temperature is made sufficiently high and the current at the time of charging is made sufficiently small, in order to form a favorable film 22C that is thin but has high durability. Specifically, the environmental temperature is within a range from 40° C. to 60° C. both inclusive, and the current at the time of charging is within a range from 0.02 C to 0.05 C both inclusive. Note that 1 C is a value of a current that causes a battery capacity (a theoretical capacity) to be completely discharged in 1 hour. Accordingly, 0.02 C is a value of a current that causes the battery capacity to be completely discharged in 50 (=1/0.02) hours, and 0.05 C is a value of a current that causes the battery capacity to be completely discharged in 20 (=1/0.05) hours. As described above, the intensity ratio R changes depending on the conditions including, without limitation, the environmental temperature and the current at the time of charging in the case of stabilizing the secondary battery, and is thus controllable based on such conditions.

Note that, after the stabilization process of the secondary battery is completed, that is, after the negative electrode 22 is fabricated (after the film 22C is formed on the surface of each of the negative electrode active material layers 22B), each of the first sulfur-containing compound and the second sulfur-containing compound used for forming the film 22C may or may not remain in the electrolytic solution.

According to the secondary battery of an embodiment, the negative electrode 22 includes the film 22C covering the surface of the negative electrode active material layer 22B, the film 22C includes sulfur and oxygen as constituent elements, and the intensity ratio R is within the range from 0.100 to 0.250 both inclusive.

In this case, the intensity ratio R is made appropriate, that is, a balance between an abundance of components derived from $SO^{2-}$ and an abundance of components derived from $S^{-}$ is made appropriate in the film 22C. A favorable film 22C that is thin but has high durability is thus formed on the surface of the negative electrode active material layer 22B as described above. This suppresses the decomposition reaction of the electrolytic solution on the surface of the negative electrode 22, while suppressing an increase in electric resistance and securing insertion and extraction of lithium in the negative electrode 22 (the negative electrode active material layer 22B).

More specifically, if the intensity ratio R is less than 0.100, the intensity ratio R is too small, which secures insertion and extraction of lithium and suppresses the decomposition reaction of the electrolytic solution, but increases the electric resistance of the negative electrode active material layer 22B. However, if the intensity ratio R is greater than or equal to 0.100, the electric resistance of the negative electrode active material layer 22B decreases, while insertion and extraction of lithium are secured and the decomposition reaction of the electrolytic solution is suppressed.

On the other hand, if the intensity ratio R is greater than 0.250, the intensity ratio R is too large, which reduces the electric resistance of the negative electrode active material layer 22B, but inhibits insertion and extraction of lithium and causes a significant decomposition reaction of the electrolytic solution. However, if the intensity ratio R is less than or equal to 0.250, insertion and extraction of lithium are secured and the decomposition reaction of the electrolytic solution is suppressed, while the electric resistance of the negative electrode active material layer 22B decreases.

As a result, lithium is smoothly inserted and extracted and the electric resistance decreases, while swelling of the secondary battery due to the decomposition reaction of the electrolytic solution (gas generation) is suppressed. This makes it possible to achieve a superior battery capacity characteristic, a superior swelling characteristic, and a superior electric resistance characteristic.

In particular, the electrolytic solution may include the first sulfur-containing compound and the second sulfur-containing compound together. This makes it easier to form the film 22C including sulfur and oxygen as constituent elements on the surface of the negative electrode active material layer 22B. Accordingly, it is possible to achieve higher effects. In this case, the electrolytic solution may include both the first sulfur-containing compound and the second sulfur-containing compound also after the stabilization process of the secondary battery (i.e., after the formation of the film 22C). This makes it easier to additionally form the film 22C upon charging and discharging after the stabilization process. Accordingly, it is possible to achieve further higher effects.

Further, the content of the first sulfur-containing compound in the electrolytic solution may be within the range from 0.001 wt % to 2.0 wt % both inclusive, and the content of the second sulfur-containing compound in the electrolytic solution may be within the range from 0.001 wt % to 2.0 wt % both inclusive. This makes it sufficiently easier to form the film 22C on the surface of the negative electrode active material layer 22B. Accordingly, it is possible to achieve higher effects.

Further, the secondary battery may include the outer package film 10 having flexibility. In such a case, even if the outer package film 10 is used which is easily deformable and thus inherently tends to cause swelling, the swelling of the secondary battery is effectively suppressed. Accordingly, it is possible to achieve higher effects.

Further, the secondary battery may include a lithium-ion secondary battery. This makes it possible to obtain a sufficient battery capacity stably through the use of insertion and extraction of lithium. Accordingly, it is possible to achieve higher effects.

A description is provided of a secondary battery according to an embodiment of the present technology.

As described below, the secondary battery according to an embodiment has a configuration similar to that of the secondary battery described above, except for a difference in the method of forming the film 22C and a difference in the composition of the film 22C. In the following description, FIGS. 1 and 2 will be referred to where appropriate.

The film 22C is formed by a coating method in a process of fabricating the negative electrode 22, and includes sulfur and oxygen as constituent elements, as will be described later.

Here, the film 22C may include a third sulfur-containing compound and a fourth sulfur-containing compound. The third sulfur-containing compound includes a compound represented by Formula (14), a compound represented by Formula (15), or both. The fourth sulfur-containing compound includes a compound represented by Formula (16).

A reason why the film 22C includes the third sulfur-containing compound and the fourth sulfur-containing compound together is similar to the reason why the electrolytic solution includes the first sulfur-containing compound and the second sulfur-containing compound together according to an embodiment and as described herein.

That is, it becomes easier to form, on the surface of the negative electrode active material layer 22B, the film 22C that includes sulfur and oxygen as constituent elements owing to the decomposition and the reaction of each of the third sulfur-containing compound and the fourth sulfur-containing compound upon the stabilization process of the secondary battery. Further, even if a portion of the film 22C is decomposed upon charging and discharging, it becomes easier to additionally form the film 22C owing to decomposition and a reaction of each of the third sulfur-containing compound and the fourth sulfur-containing compound at a subsequent cycle of charging and discharging.

[Chem. 16]

(14)

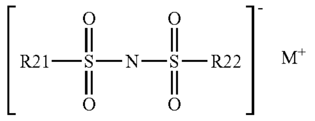

(15)

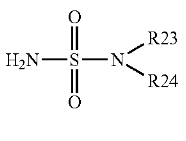

Where:

each of R21 and R22 is one of a hydrogen group, a halogen group, an alkyl group, or a halogenated alkyl group;

M is an alkali metal element; and each of R23 and R24 is one of a hydrogen group, an alkyl group, or a halogenated alkyl group.

[Chem. 17]

(16)

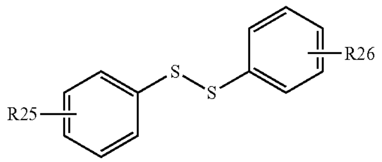

Where each of R25 and R26 is one of a hydrogen group, an alkyl group, or a halogenated alkyl group.

Each of the third sulfur-containing compound and the fourth sulfur-containing compound is a substance to be a source of sulfur, that is, a compound including sulfur as a constituent element, as with each of the first sulfur-containing compound and the second sulfur-containing compound described above. Only one third sulfur-containing compound may be used, or two or more third sulfur-containing compounds may be used. Only one fourth sulfur-containing compound may be used, or two or more fourth sulfur-containing compounds may be used.

The compound represented by Formula (14) which is the first kind of third sulfur-containing compound is a chain metal salt having a disulfonyl-imide-type structure ($-S(=O)_2-N^--S(=O)_2-$). Each of R21 and R22 is not particularly limited as long as each of R21 and R22 is one of a hydrogen group, a halogen group, an alkyl group, or a halogenated alkyl group. Details of each of the halogen group, the alkyl group, and the halogenated alkyl group are as described above. M is not particularly limited as long as M is an alkali metal element, and specific examples thereof include lithium, sodium, and potassium.

The compound represented by Formula (15) which is the second kind of third sulfur-containing compound is a chain compound having a sulfone-amide-imide-type structure ($>N-S(=O)_2-NH_2$). Each of R23 and R24 is not particularly limited as long as each of R23 and R24 is one of a hydrogen group, an alkyl group, or a halogenated alkyl group. Details of each of the alkyl group and the halogenated alkyl group are as described above.

The compound represented by Formula (16) which is the fourth sulfur-containing compound is a cyclic compound having a dithiophenyl-type structure ($-C_6H_4-S-S-C_6H_4-$). Each of R25 and R26 is not particularly limited as long as each of R25 and R26 is one of a hydrogen group, an alkyl group, or a halogenated alkyl group. Details of each of the alkyl group and the halogenated alkyl group are as described above.

As is apparent from Formula (16), R25 is bonded to one of two benzene rings, and R26 is bonded to another of the two benzene rings. In this case, R25 may be bonded to a carbon atom at any position of the one benzene ring, and R26 may be bonded to a carbon atom at any position of the other benzene ring.

In particular, the third sulfur-containing compound preferably includes the compound represented by Formula (14), and the film 22C thus preferably includes the compound represented by Formula (14) which is the third sulfur-containing compound and the compound represented by Formula (16) which is the fourth sulfur-containing compound. A reason for this is that it becomes further easier to form the film 22C on the surface of the negative electrode active material layer 22B.

Specific examples of the third sulfur-containing compound and specific examples of the fourth sulfur-containing compound are as described below. A reason for this is that it becomes sufficiently easier to form the film 22C on the surface of the negative electrode active material layer 22B.

Specific examples of the compound represented by Formula (14) which is the first kind of third sulfur-containing compound include respective compounds represented by Formulae (14-1) to (14-3).

[Chem. 18]

(14-1)

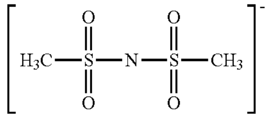

(14-2)

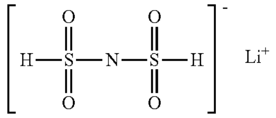

(14-3)

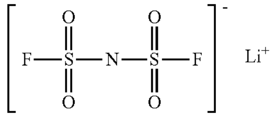

Specific examples of the compound represented by Formula (15) which is the second kind of third sulfur-containing compound include respective compounds represented by Formulae (15-1) to (15-3).

[Chem. 19]

(15-1)

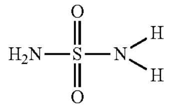

(15-2)

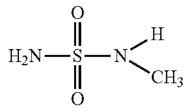

(15-3)

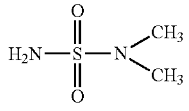

Specific examples of the compound represented by Formula (16) which is the fourth sulfur-containing compound include respective compounds represented by Formulae (16-1) and (16-2).

[Chem. 20]

(16-1)

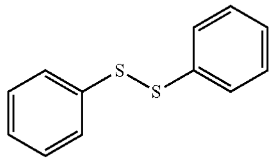

-continued (16-2)

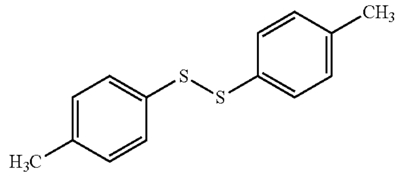

A content of the third sulfur-containing compound and a content of the fourth sulfur-containing compound in the film 22C are not particularly limited, and may be set as desired.

In the secondary battery according to an embodiment, the predetermined physical property condition is satisfied regarding the film 22C, in order to improve each of the battery capacity characteristic, the swelling characteristic, and the electric resistance characteristic. That is, based on a negative ion analysis of the film 22C by TOF-SIMS, the intensity ratio R is within a range from 0.100 to 0.250 both inclusive.

As will be described later, the intensities I1 and I2 are each varied by changing, for example, a mixture ratio (a weight ratio) between the third sulfur-containing compound and the fourth sulfur-containing compound, and the intensity ratio R is accordingly adjustable to a desired value.

The secondary battery according to an embodiment performs an operation similar to as described above. That is, upon charging, lithium is inserted and extracted in an ionic state in the battery device 20 (the positive electrode 21 and the negative electrode 22).

A method of manufacturing the secondary battery according to an embodiment is similar to the method of manufacturing the secondary battery described above, except for a difference in the fabrication procedure of the negative electrode 22, as described below.

In the case of fabricating the negative electrode 22, first, the negative electrode active material layers 22B are formed on the respective two opposed surfaces of the negative electrode current collector 22A by the procedure described above.

Thereafter, the third sulfur-containing compound and the fourth sulfur-containing compound are put into a solvent, following which the solvent is stirred. The third sulfur-containing compound and the fourth sulfur-containing compound are thereby each dispersed or dissolved in the solvent. As a result, a coating solution is prepared. The solvent is not particularly limited in kind as long as the solvent allows for dissolution of each of the third sulfur-containing compound and the fourth sulfur-containing compound. Specifically, the solvent is a non-aqueous solvent (an organic solvent), an aqueous solvent, or both.

Lastly, the coating solution is applied on the surface of each of the negative electrode active material layers 22B, following which the coating solution is dried. The film 22C including sulfur and oxygen as constituent elements is thereby formed on the surface of each of the negative electrode active material layers 22B. Thus, the negative electrode 22 is fabricated.

In this case, the intensities I1 and I2 are each varied by changing, for example: (1) a mixture ratio (a weight ratio) between the third sulfur-containing compound and the fourth sulfur-containing compound in the film 22C, that is, the mixture ratio (the weight ratio) between the third sulfur-containing compound and the fourth sulfur-containing compound in the coating solution; (2) a mixture ratio (a weight ratio) of the solvent to the third sulfur-containing compound and the fourth sulfur-containing compound in the coating solution; (3) a mixture ratio (a weight ratio) of the solvent (the organic solvent and the aqueous solvent) used to prepare the coating solution; and (4) a drying temperature of the coating solution. The intensity ratio R is accordingly adjustable.

For example, the mixture ratio (the weight ratio) between the third sulfur-containing compound and the fourth sulfur-containing compound is within a range from 1:31 to 1:3 both inclusive. The mixture ratio (the weight ratio) of the solvent between the organic solvent and the aqueous solvent is within a range from 10:90 to 90:10 both inclusive. The drying temperature of the coating solution is within a range from 50° C. to 90° C. both inclusive.

According to the secondary battery of an embodiment, the negative electrode 22 includes the film 22C, the film 22C includes sulfur and oxygen as constituent elements, and the intensity ratio R is within the range from 0.100 to 0.250 both inclusive. This makes it possible to achieve a superior battery capacity characteristic, a superior swelling characteristic, and a superior electric resistance characteristic for the reason described above.

In particular, the film 22C may include the third sulfur-containing compound and the fourth sulfur-containing compound together. This makes it easier to form the film 22C including sulfur and oxygen as constituent elements on the surface of the negative electrode active material layer 22B. Accordingly, it is possible to achieve higher effects.

Other action and effects of the secondary battery according to an embodiment are similar to those described herein.

The configuration of the secondary battery is appropriately modifiable including as described below according to an embodiment. Note that any two or more of the following series of modifications may be combined with each other.

The separator 23 which is a porous film is used. However, although not specifically illustrated here, a separator of a stacked type including a polymer compound layer may be used instead of the separator 23 which is the porous film.

For example, the separator of the stacked type includes a porous film having two opposed surfaces, and the polymer compound layer disposed on one of or each of the two opposed surfaces of the porous film. A reason for this is that adherence of the separator to each of the positive electrode 21 and the negative electrode 22 improves to suppress misalignment (irregular winding of each of the positive electrode 21, the negative electrode 22, and the separator) of the battery device 20. This suppresses the swelling of the secondary battery even if, for example, the decomposition reaction of the electrolytic solution occurs. The polymer compound layer includes a polymer compound such as polyvinylidene difluoride. A reason for this is that the polymer compound such as polyvinylidene difluoride has superior physical strength and is electrochemically stable.

Note that the porous film, the polymer compound layer, or both may each include one or more kinds of insulating particles. A reason for this is that the insulating particles dissipate heat upon heat generation by the secondary battery, thus improving safety or heat resistance of the secondary battery. Examples of the insulating particles include inorganic particles and resin particles. Specific examples of the inorganic particles include particles of: aluminum oxide, aluminum nitride, boehmite, silicon oxide, titanium oxide, magnesium oxide, and zirconium oxide. Specific examples of the resin particles include particles of acrylic resin and particles of styrene resin.

In a case of fabricating the separator of the stacked type, a precursor solution including, without limitation, the polymer compound and an organic solvent is prepared, following which the precursor solution is applied on one of or each of the two opposed surfaces of the porous film. In this case, insulating particles may be added to the precursor solution.

In the case where the separator of the stacked type is used also, lithium ions are movable between the positive electrode 21 and the negative electrode 22, and similar effects are therefore obtainable.

The electrolytic solution which is a liquid electrolyte is used. However, although not specifically illustrated here, an electrolyte layer which is a gel electrolyte may be used instead of the electrolytic solution.

In the battery device 20 including the electrolyte layer, the positive electrode 21 and the negative electrode 22 are stacked on each other with the separator 23 and the electrolyte layer interposed therebetween, and the stack of the positive electrode 21, the negative electrode 22, the separator 23, and the electrolyte layer is wound. The electrolyte layer is interposed between the positive electrode 21 and the separator 23, and between the negative electrode 22 and the separator 23.

For example, the electrolyte layer includes a polymer compound together with the electrolytic solution. The electrolytic solution is held by the polymer compound in the electrolyte layer. A reason for this is that leakage of the electrolytic solution is prevented. The configuration of the electrolytic solution is as described above. The polymer compound includes, for example, polyvinylidene difluoride. In a case of forming the electrolyte layer, a precursor solution including, for example, the electrolytic solution, the polymer compound, and an organic solvent is prepared, following which the precursor solution is applied on one side or both sides of the positive electrode 21 and on one side or both sides of the negative electrode 22.

In a case where the electrolyte layer is used also, lithium ions are movable between the positive electrode 21 and the negative electrode 22 via the electrolyte layer, and similar effects are therefore obtainable.

Next, a description is given of applications (application examples) of the above-described secondary battery according to an embodiment.

The applications of the secondary battery are not particularly limited. The secondary battery used as a power source serves as a main power source or an auxiliary power source of, for example, electronic equipment and an electric vehicle. The main power source is preferentially used regardless of the presence of any other power source. The auxiliary power source is used in place of the main power source, or is switched from the main power source.

Specific examples of the applications of the secondary battery include: electronic equipment; apparatuses for data storage; electric power tools; battery packs to be mounted on, for example, electronic equipment; medical electronic equipment; electric vehicles; and electric power storage systems. Examples of the electronic equipment include video cameras, digital still cameras, mobile phones, laptop personal computers, headphone stereos, portable radios, and portable information terminals. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems or industrial battery systems for accumulation of electric power for a situation such as emergency. The above-described applications may each use one secondary battery, or may each use multiple secondary batteries.

The battery packs may each include a single battery, or may each include an assembled battery. The electric vehicle is a vehicle that operates (travels) using the secondary battery as a driving power source, and may be a hybrid automobile that is additionally provided with a driving source other than the secondary battery. In an electric power storage system for home use, electric power accumulated in the secondary battery which is an electric power storage source may be utilized for using, for example, home appliances.

An application example of the secondary battery will now be described in detail. The configuration of the application example described below is merely an example, and is appropriately modifiable.

Figure 3:
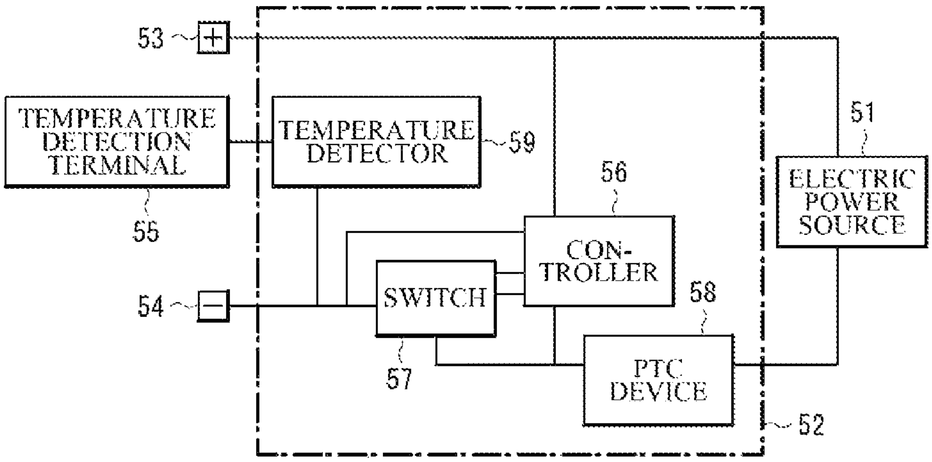
FIG. 3 is a block diagram illustrating a configuration of an application example of the secondary battery.

FIG. 3 illustrates a block configuration of a battery pack. The battery pack described here is a battery pack (a so-called soft pack) including one secondary battery, and is to be mounted on, for example, electronic equipment typified by a smartphone.

As illustrated in FIG. 3, the battery pack includes an electric power source 51 and a circuit board 52. The circuit board 52 is coupled to the electric power source 51, and includes a positive electrode terminal 53, a negative electrode terminal 54, and a temperature detection terminal 55.

The electric power source 51 includes one secondary battery. The secondary battery has a positive electrode lead coupled to the positive electrode terminal 53 and a negative electrode lead coupled to the negative electrode terminal 54. The electric power source 51 is couplable to outside via the positive electrode terminal 53 and the negative electrode terminal 54, and is thus chargeable and dischargeable. The circuit board 52 includes a controller 56, a switch 57, a thermosensitive resistive device (a PTC device) 58, and a temperature detector 59. However, the PTC device 58 may be omitted.

The controller 56 includes, for example, a central processing unit (CPU) and a memory, and controls an overall operation of the battery pack. The controller 56 detects and controls a use state of the electric power source 51 on an as-needed basis.

If a voltage of the electric power source 51 (the secondary battery) reaches an overcharge detection voltage or an overdischarge detection voltage, the controller 56 turns off the switch 57. This prevents a charging current from flowing into a current path of the electric power source 51. The overcharge detection voltage and the overdischarge detection voltage are not particularly limited. For example, the overcharge detection voltage is 4.2 V±0.05 V and the overdischarge detection voltage is 2.4 V±0.1 V.

The switch 57 includes, for example, a charge control switch, a discharge control switch, a charging diode, and a discharging diode. The switch 57 performs switching between coupling and decoupling between the electric power source 51 and external equipment in accordance with an instruction from the controller 56. The switch 57 includes, for example, a metal-oxide-semiconductor field-effect transistor (MOSFET). The charging and discharging currents are detected based on an ON-resistance of the switch 57.

The temperature detector 59 includes a temperature detection device such as a thermistor. The temperature detector 59 measures a temperature of the electric power source 51 using the temperature detection terminal 55, and outputs a result of the temperature measurement to the controller 56. The result of the temperature measurement to be obtained by the temperature detector 59 is used, for example, in a case where the controller 56 performs charge/discharge control upon abnormal heat generation or in a case where the controller 56 performs a correction process upon calculating a remaining capacity.

EXAMPLES

A description is given of Examples of the present technology below according to an embodiment.

Examples 1 to 21 and Comparative Examples 1 to 10

Secondary batteries were manufactured, following which the secondary batteries were each evaluated for a battery characteristic.

[Manufacturing of Secondary Battery]

The secondary batteries (lithium-ion secondary batteries) of the laminated-film type illustrated in FIGS. 1 and 2 were manufactured in accordance with the following procedure.

(Fabrication of Positive Electrode)

First, 96 parts by mass of the positive electrode active material (lithium cobalt oxide ($LiCoO_2$)), 2 parts by mass of the positive electrode binder (polyvinylidene difluoride), and 2 parts by mass of the positive electrode conductor (graphite) were mixed with each other to thereby obtain a positive electrode mixture. Thereafter, the positive electrode mixture was put into a solvent (N-methyl-2-pyrrolidone which was an organic solvent), following which the organic solvent was stirred to thereby prepare a paste positive electrode mixture slurry. Thereafter, the positive electrode mixture slurry was applied on the two opposed surfaces of the positive electrode current collector 21A (a band-shaped aluminum foil having a thickness of 15 m) by means of a coating apparatus, following which the applied positive electrode mixture slurry was dried to thereby form the positive electrode active material layers 21B. Lastly, the positive electrode active material layers 21B were compression-molded by means of a roll pressing machine. In this manner, the positive electrode 21 was fabricated.

(Fabrication of Negative Electrode)

First, 95.7 parts by mass of the negative electrode active material (mesocarbon microbeads (MCMB)), 2.3 parts by mass of the negative electrode binder (carboxymethyl cellulose), and 2 parts by mass of the positive electrode conductor (graphite) were mixed with each other to thereby obtain a negative electrode mixture. Thereafter, the negative electrode mixture was put into a solvent (N-methyl-2-pyrrolidone which was an organic solvent), following which the organic solvent was stirred to thereby prepare a paste negative electrode mixture slurry. Thereafter, the negative electrode mixture slurry was applied on the two opposed surfaces of the negative electrode current collector 22A (a band-shaped copper foil having a thickness of 15 m) by means of a coating apparatus, following which the applied negative electrode mixture slurry was dried to thereby form the negative electrode active material layers 22B. Thereafter, the negative electrode active material layers 22B were compression-molded by means of a roll pressing machine. In this manner, the negative electrode precursor was fabricated. Lastly, as will be described later, the secondary battery was assembled using the negative electrode precursor, following which the stabilization process (the first charge and discharge process) was performed on the secondary battery. In this manner, the film 22C including sulfur and oxygen as constituent elements was formed on the surface of each of the negative electrode active material layers 22B. Thus, the negative electrode 22 was fabricated.

(Preparation of Electrolytic Solution)

The electrolyte salt (lithium hexafluorophosphate ($LiPF_6$)) was put into the solvent, following which the solvent was stirred. Used as the solvent were the cyclic carbonic acid ester (ethylene carbonate and propylene carbonate), the chain carbonic acid ester (diethyl carbonate), the chain carboxylic acid ester (propyl propionate), the unsaturated cyclic carbonic acid ester (vinylene carbonate), and the nitrile compound (succinonitrile). In this case, the mixture ratio (the weight ratio) of the solvent between ethylene carbonate, propylene carbonate, diethyl carbonate, propyl propionate, vinylene carbonate, and succinonitrile was set to 20:10:20:29:1:5, and the content of the electrolyte salt was set to 1.2 mol/kg with respect to the solvent.

Thereafter, the first sulfur-containing compound and the second sulfur-containing compound were added to the solvent including the electrolyte salt, following which the solvent was stirred. The kind of the first sulfur-containing compound and the kind of the second sulfur-containing compound were as listed in Tables 1 and 2. In this manner, the electrolytic solution was prepared.

For comparison, the electrolytic solution was prepared by a similar procedure except that neither the first sulfur-containing compound nor the second sulfur-containing compound was used. Further, for comparison, the electrolytic solution was prepared by a similar procedure except that only either the first sulfur-containing compound or the second sulfur-containing compound was used. The kind of the first sulfur-containing compound and the kind of the second sulfur-containing compound were as listed in Table 3.

(Assembly of Secondary Battery)

First, the positive electrode lead 31 (an aluminum wire) was welded to the positive electrode 21 (the positive electrode current collector 21A), and the negative electrode lead 32 (a copper wire) was welded to the negative electrode precursor (the negative electrode current collector 22A).

Thereafter, the positive electrode 21 and the negative electrode precursor were stacked on each other with the separator 23 (a fine-porous polyethylene film having a thickness of 25 m) interposed therebetween, following which the stack of the positive electrode 21, the negative electrode precursor, and the separator 23 was wound to thereby fabricate the wound body. Thereafter, the wound body was pressed by means of a pressing machine, and was thereby shaped into an elongated shape.

Thereafter, the outer package film 10 (the fusion-bonding layer/the metal layer/the surface protective layer) was folded in such a manner as to sandwich the wound body contained inside the depression part 10U, following which the outer edge parts of two sides of the outer package film 10 (the fusion-bonding layer) were thermal-fusion-bonded to each other to thereby allow the wound body to be contained inside the outer package film 10 having the pouch shape. As the outer package film 10, an aluminum laminated film was used in which the fusion-bonding layer (a polypropylene film having a thickness of 30 m), the metal layer (an aluminum foil having a thickness of 40 m), and the surface protective layer (a nylon film having a thickness of 25 m) were stacked in this order from an inner side.

Lastly, the electrolytic solution was injected into the outer package film 10 having the pouch shape and thereafter, the outer edge parts of the remaining one side of the outer package film 10 (the fusion-bonding layer) were thermal-fusion-bonded to each other in a reduced-pressure environment. In this case, the sealing film 41 (a polypropylene film having a thickness of 5 m) was interposed between the outer package film 10 and the positive electrode lead 31, and the sealing film 42 (a polypropylene film having a thickness of 5 m) was interposed between the outer package film 10 and the negative electrode lead 32. In this manner, the wound body was impregnated with the electrolytic solution, and the wound body was sealed in the outer package film 10 having the pouch shape. The secondary battery was thus assembled.

(Stabilization of Secondary Battery)

The assembled secondary battery was charged and discharged for one cycle in an environment at a predetermined temperature. Upon the charging, the secondary battery was charged with a predetermined constant current until a voltage reached 4.4 V, and was thereafter charged with a constant voltage of 4.4 V until a current reached 0.005 C. Upon the discharging, the secondary battery was discharged with a constant current of 0.5 C until the voltage reached 3.0 V. The temperature in the environment (the environmental temperature (° C.)) and the current at the time of charging (a charging current (C)) were each as listed in Tables 1 to 3. A charging current of 1 C is a value of a current that causes a battery capacity (a theoretical capacity) to be completely discharged in 1 hour. Accordingly, the charging current of 0.005 C is a value of a current that causes the battery capacity to be completely discharged in 200 (=1/0.005) hours.

In this manner, as described above, the film 22C including sulfur and oxygen as constituent elements was formed on the surface of each of the negative electrode active material layers 22B, and the negative electrode 22 was thus fabricated. As a result, the battery device 20 was fabricated and the state of the battery device 20 was electrochemically stabilized. The secondary battery of the laminated-film type was thus completed.

Note that, in a case where the electrolytic solution included neither the first sulfur-containing compound nor the second sulfur-containing compound, the film 22C including sulfur and oxygen as constituent elements was not formed on the surface of each of the negative electrode active material layers 22B. Thus, the negative electrode 22 including no film 22C was fabricated.

After the completion of the secondary battery, the secondary battery was disassembled to thereby collect the electrolytic solution. Thereafter, the electrolytic solution was analyzed by inductively coupled plasma (ICP) optical emission spectroscopy. As a result, the content (wt %) of the first sulfur-containing compound in the electrolytic solution and the content (wt %) of the second sulfur-containing compound in the electrolytic solution were as listed in Table 1.

In the case of fabricating the secondary battery, the conditions in the case of performing the stabilization process on the secondary battery, more specifically, the environmental temperature and the charging current were each changed to thereby vary each of the intensity I1 of the first peak and the intensity I2 of the second peak and vary the intensity ratio R.

[Evaluation of Battery Characteristic]

Evaluation of the secondary batteries for their battery characteristics (the battery capacity characteristic, the swelling characteristic, and the electric resistance characteristic) revealed the results presented in Tables 1 to 3.

(Battery Capacity Characteristic)

The secondary battery was charged and discharged in an ambient temperature environment (at a temperature of 23°

C.) to thereby measure a discharge capacity (mAh/g) which was an index for evaluating the battery capacity. Charging and discharging conditions were similar to those in the case of performing the stabilization process on the secondary battery described above.

(Swelling Characteristic)

First, the secondary battery was charged and discharged in an ambient temperature environment (at a temperature of 23° C.), following which a thickness (a pre-storage thickness) of the secondary battery was measured. Charging and discharging conditions were similar to those in the case of performing the stabilization process on the secondary battery described above. Thereafter, the secondary battery was charged, and the charged secondary battery was stored in a high-temperature environment (at a temperature of 60° C.) for a storage time of 1 week, following which the thickness (a post-storage thickness) of the charged secondary battery was measured. Charging conditions were similar to those in the case of performing the stabilization process on the secondary battery described above. Note that 0.5 C is a value of a current that causes the battery capacity to be completely discharged in 2 hours. Lastly, a swelling rate which was an index for evaluating the swelling characteristic was calculated based on the following calculation expression: swelling rate (%)=[(post-storage thickness—pre-storage thickness)/pre-storage thickness]×100.

(Electric Resistance Characteristic)

First, the secondary battery was charged in an ambient temperature environment (at a temperature of 23° C.). Charging conditions were similar to those in the case of performing the stabilization process on the secondary battery described above. Thereafter, the secondary battery was discharged with a constant discharging current of 0.1 C for 5 hours to thereby adjust a depth of charge of the secondary battery to 50%. The discharging current of 0.1 C is a value of a current that causes the battery capacity to be completely discharged in 10 (=1/0.1) hours. Thereafter, immediately after the depth of charge was adjusted to be 50%, the secondary battery was discharged with a constant discharging current of 1.0 C for 1 second to thereby measure an amount of voltage change ΔV between before and after the discharging with the constant discharging current. The discharging current of 1.0 C is a value of a current that causes the battery capacity to be completely discharged in 1 (=1/1.0) hour. Lastly, an electric resistance which was an index for evaluating the electric resistance characteristic was calculated based on the following calculation expression: electric resistance (mΩ)=amount of voltage change ΔV/discharging current (=1.0 C).

TABLE 1

| | First sulfur-containing compound | | Second sulfur-containing compound | | Stabilization process | | | | | |
|---|---|---|---|---|---|---|---|---|---|---|
| | Kind | Content (wt %) | Kind | Content (wt %) | Charging current (C) | Environmental temperature (° C.) | Intensity ratio R | Discharge capacity (mAh/g) | Swelling rate (%) | Electric resistance (mΩ) |
| Example 1 | Formula (2-1) | 1.0 | Formula (12-5) | 0.8 | 0.01 | 45 | 0.250 | 185 | 8.7 | 49.6 |
| Example 2 | | | | | 0.02 | 45 | 0.206 | 185 | 8.2 | 51.5 |
| Example 3 | | | | | 0.03 | 45 | 0.174 | 191 | 7.5 | 52.2 |
| Example 4 | | | | | 0.03 | 50 | 0.172 | 190 | 7.3 | 52.3 |
| Example 5 | | | | | 0.03 | 60 | 0.167 | 189 | 6.8 | 52.7 |
| Example 6 | | | | | 0.04 | 50 | 0.100 | 190 | 6.0 | 53.3 |
| Example 7 | Formula (2-2) | 1.0 | Formula (12-5) | 0.8 | 0.05 | 60 | 0.156 | 189 | 6.2 | 53.4 |
| Example 8 | Formula (2-3) | 1.0 | Formula (12-5) | 0.8 | 0.03 | 45 | 0.200 | 184 | 8.1 | 52.1 |
| Example 9 | Formula (3-2) | 1.0 | Formula (12-5) | 0.8 | 0.05 | 45 | 0.231 | 185 | 8.6 | 49.7 |
| Example 10 | | | | | 0.05 | 60 | 0.214 | 185 | 8.3 | 49.9 |
| Example 11 | | | | | 0.03 | 60 | 0.202 | 185 | 8.1 | 51.8 |
| Example 12 | Formula (3-4) | 1.0 | Formula (12-5) | 0.8 | 0.05 | 45 | 0.214 | 185 | 8.4 | 49.9 |

TABLE 2

| | First sulfur-containing compound | | Second sulfur-containing compound | | Stabilization process | | | | | |
|---|---|---|---|---|---|---|---|---|---|---|
| | Kind | Content (wt %) | Kind | Content (wt %) | Charging current (C) | Environmental temperature (° C.) | Intensity ratio R | Discharge capacity (mAh/g) | Swelling rate (%) | Electric resistance (mΩ) |
| Example 13 | Formula (2-1) | 1.0 | Formula (13-1) | 0.8 | 0.03 | 45 | 0.196 | 184 | 8.0 | 52.8 |
| Example 14 | Formula (3-6) | 1.0 | Formula (12-2) | 0.8 | 0.03 | 45 | 0.250 | 185 | 8.6 | 48.9 |
| Example 15 | Formula (5-1) | 1.0 | Formula (12-7) | 0.8 | 0.03 | 45 | 0.134 | 188 | 6.1 | 53.9 |
| Example 16 | Formula (10-1) | 1.0 | Formula (13-1) | 0.8 | 0.05 | 60 | 0.100 | 187 | 6.0 | 53.2 |
| Example 17 | Formula (7-1) | 1.0 | Formula (13-1) | 0.8 | 0.05 | 60 | 0.126 | 188 | 6.2 | 53.3 |
| Example 18 | Formula (11-2) | 1.0 | Formula (12-7) | 0.8 | 0.05 | 60 | 0.132 | 188 | 6.2 | 53.7 |
| Example 19 | Formula (11-2) + Formula (6-1) | 0.5 + 0.5 | Formula (12-5) | 0.8 | 0.05 | 60 | 0.145 | 189 | 6.4 | 54.2 |
| Example 20 | Formula (4-2) | 1.0 | Formula (13-2) | 0.8 | 0.03 | 45 | 0.153 | 188 | 6.7 | 54.2 |
| Example 21 | Formula (8-1) | 1.0 | Formula (13-1) | 0.8 | 0.03 | 45 | 0.140 | 189 | 6.9 | 54.1 |

TABLE 3

| | First sulfur-containing compound | | Second sulfur-containing compound | | Stabilization process | | | | | |
|---|---|---|---|---|---|---|---|---|---|---|
| | Kind | Content (wt %) | Kind | Content (wt %) | Charging current (C) | Environmental temperature (° C.) | Intensity ratio R | Discharge capacity (mAh/g) | Swelling rate (%) | Electric resistance (mΩ) |
| Comparative example 1 | — | — | — | — | 0.1 | 23 | — | 174 | 35.3 | 83.6 |
| Comparative example 2 | Formula (2-1) | 1.8 | — | — | 0.1 | 25 | 0.086 | 190 | 5.1 | 61.7 |
| Comparative example 3 | | | | | 2.0 | 25 | 0.055 | 191 | 4.7 | 74.3 |
| Comparative example 4 | Formula (3-1) | 1.8 | — | — | 0.1 | 23 | 0.074 | 189 | 4.8 | 65.2 |
| Comparative example 5 | — | — | Formula (12-5) | 1.8 | 0.05 | 23 | 0.386 | 183 | 23.9 | 46.3 |
| Comparative example 6 | Formula (2-3) | 1.0 | Formula (12-5) | 0.8 | 0.1 | 23 | 0.261 | 185 | 17.3 | 47.2 |
| Comparative example 7 | | | | | 2.0 | 23 | 0.252 | 185 | 16.5 | 49.4 |
| Comparative example 8 | Formula (5-1) | 1.0 | Formula (12-7) | 0.8 | 0.2 | 23 | 0.095 | 189 | 5.2 | 61.3 |
| Comparative example 9 | Formula (11-2) | 1.0 | Formula (12-7) | 0.8 | 2.0 | 25 | 0.085 | 189 | 5.6 | 61.5 |
| Comparative example 10 | Formula (8-1) | 1.0 | Formula (12-5) | 0.8 | 0.2 | 25 | 0.079 | 189 | 5.9 | 63.7 |

As indicated in Tables 1 to 3, the discharge capacity, the swelling rate, and the electric resistance each varied greatly depending on the intensity ratio R.

In a case where the electrolytic solution included neither the first sulfur-containing compound nor the second sulfur-containing compound (Comparative example 1), it was not possible to calculate the intensity ratio R because no film 22C was formed. As a result, the discharge capacity decreased, and the swelling rate and the electric resistance each increased.

In contrast, in a case where the electrolytic solution included the first sulfur-containing compound, the second sulfur-containing compound, or both (Examples 1 to 21 and Comparative examples 2 to 10), it was possible to calculate the intensity ratio R because the film 22C was formed. In this case, the discharge capacity, the swelling rate, and the electric resistance each varied greatly depending on the intensity ratio R as described above.

That is, in a case where the intensity ratio R did not satisfy the appropriate condition, i.e., the intensity ratio R within the range from 0.100 to 0.250 both inclusive (Comparative examples 2 to 10), a trade-off relationship was exhibited in which improvement of one of characteristic values of the discharge capacity, the swelling rate, and the electric resistance causes degradation of the rest of the characteristic values. As a result, not all of the discharge capacity, the swelling rate, and the electric resistance improved.

However, in a case where the intensity ratio R satisfied the appropriate condition (Examples 1 to 21), the above-described trade-off relationship was overcome, which allowed for improvement of all of the discharge capacity, the swelling rate, and the electric resistance.

Examples 22 to 28 and Comparative Examples 11 to 15

Secondary batteries were manufactured by a similar procedure except that the film 22C was formed by a coating method, instead of forming the film 22C through the stabilization process on the secondary battery, following which the secondary batteries were each evaluated for the battery characteristic.

In the case of fabricating the negative electrode 22, after the negative electrode active material layers 22B were formed on the respective two opposed surfaces of the negative electrode current collector 22A, the third sulfur-containing compound and the fourth sulfur-containing compound were put into the solvent (a mixture in which N-methyl-2-pyrrolidone which was an organic solvent and pure water which was an aqueous solvent were mixed at a mixture ratio (a weight ratio) of 50:50), following which the solvent was stirred to thereby prepare a coating solution. The kind of the third sulfur-containing compound and the kind of the fourth sulfur-containing compound were as listed in Table 4. Thereafter, the coating solution was applied on the surface of each of the negative electrode active material layers 22B by a spin coating method, following which the coating solution was subjected to vacuum drying to thereby form the film 22C. The kind of the third sulfur-containing compound and the kind of the fourth sulfur-containing compound were as listed in Table 4.

For comparison, the negative electrode 22 including no film 22C was fabricated by a similar procedure except that the coating solution was not applied on the surface of each of the negative electrode active material layers 22B and the film 22C was thus not formed. Further, for comparison, the negative electrode 22 including the film 22C was fabricated by a similar procedure except that the coating solution including only either the third sulfur-containing compound or the fourth sulfur-containing compound was used. The kind of the third sulfur-containing compound and the kind of the fourth sulfur-containing compound were as listed in Table 4.

In the case of fabricating the secondary battery, at the time of preparing the coating solution, the mixture ratio (the weight ratio) between the third sulfur-containing compound and the fourth sulfur-containing compound was changed to thereby vary the intensity ratio R.

TABLE 4

| | Third sulfur-containing compound | Fourth sulfur-containing compound | Intensity ratio R | Discharge capacity (mAh/g) | Swelling rate (%) | Electric resistance (mΩ) |
|---|---|---|---|---|---|---|
| Example 22 | Formula (14-1) | Formula (16-1) | 0.250 | 186 | 8.6 | 49.4 |
| Example 23 | | | 0.182 | 188 | 8.2 | 53.6 |
| Example 24 | | | 0.100 | 191 | 6.7 | 57.9 |
| Example 25 | Formula (14-2) | Formula (16-1) | 0.179 | 189 | 8.1 | 56.4 |
| Example 26 | Formula (14-2) | Formula (16-2) | 0.188 | 188 | 8.0 | 55.7 |
| Example 27 | Formula (14-3) | Formula (16-1) | 0.190 | 188 | 7.9 | 56.3 |
| Example 28 | Formula (15-1) | Formula (16-2) | 0.156 | 190 | 7.9 | 57.1 |
| Comparative example 11 | — | — | — | 181 | 32.7 | 70.3 |
| Comparative example 12 | Formula (14-1) | — | 0.087 | 192 | 7.9 | 64.0 |
| Comparative example 13 | Formula (14-2) | — | 0.085 | 192 | 7.5 | 63.9 |
| Comparative example 14 | Formula (15-1) | — | 0.076 | 192 | 7.5 | 65.3 |
| Comparative example 15 | — | Formula (16-2) | 0.337 | 187 | 20.3 | 43.8 |

As indicated in Table 4, also in the case where the film 22C was formed by a coating method, results similar to the results presented in Tables 1 to 3 were obtained.

That is, in a case where the negative electrode 22 included the film 22C and the intensity ratio R satisfied the appropriate condition, i.e., the intensity ratio R within the range from 0.100 to 0.250 both inclusive (Examples 22 to 28), all of the discharge capacity, the swelling rate, and the electric resistance improved, unlike in a case where the negative electrode 22 included no film 22C (Comparative example 11) and a case where the negative electrode 22 included the film 22C but the intensity ratio R did not satisfy the appropriate condition (Comparative examples 12 to 15).

Based upon the results presented in Tables 1 to 4, if the negative electrode 22 included the film 22C, the film 22C included sulfur and oxygen as constituent elements, and the intensity ratio R was within the range from 0.100 to 0.250 both inclusive, all of the discharge capacity, the swelling rate, and the electric resistance improved. It was thus possible to achieve a superior battery capacity characteristic, a superior swelling characteristic, and a superior electric resistance characteristic.

Although the present technology has been described herein according to one or more embodiments including Examples, the configuration of the present technology is not limited thereto, and is therefore modifiable in a variety of suitable ways.

For example, the description has been given of the case where the secondary battery has a battery structure of the laminated-film type. However, the battery structure of the secondary battery is not particularly limited, and may thus be, for example, a cylindrical type, a prismatic type, a coin type, or a button type.

Further, the description has been given of the case where the battery device has a device structure of a wound type. However, the device structure of the battery device is not particularly limited, and may thus be, for example, a stacked type in which the positive electrode and the negative electrode are stacked on each other, or a zigzag folded type in which the positive electrode and the negative electrode are folded in a zigzag manner.

Further, although the description has been given of the case where the electrode reactant is lithium, the electrode reactant is not particularly limited. Specifically, the electrode reactant may be another alkali metal such as sodium or potassium, or may be an alkaline earth metal such as beryllium, magnesium, or calcium, as described above. In addition, the electrode reactant may be another light metal such as aluminum.

The effects described herein are mere examples, and effects of the present technology are therefore not limited to those described herein. Accordingly, the present technology may achieve any other suitable effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:

a positive electrode;

a negative electrode; and an electrolytic solution, wherein the negative electrode includes a negative electrode active material layer and a film, the film covering a surface of the negative electrode active material layer, the film includes sulfur and oxygen, a first peak derived from $SO^2$ and a second peak derived from $S^-$ are detectable based on a negative ion analysis of the film by time-of-flight secondary ion mass spectrometry, and a ratio of an intensity of the second peak to an intensity of the first peak is greater than or equal to 0.100 and less than or equal to 0.250.

2. The secondary battery according to claim 1, wherein the electrolytic solution includes a first sulfur-containing compound and a second sulfur-containing compound, the first sulfur-containing compound includes at least one of respective compounds represented by Formulae (1) to (11), and the second sulfur-containing compound includes a compound represented by Formula (12), a compound represented by Formula (13), or both, (1)

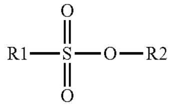

-continued (2)

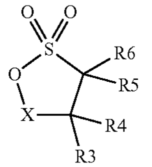

(3)

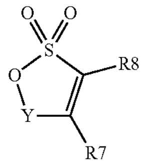

(4)

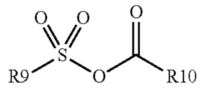

(5)

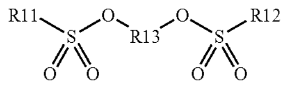

(6)

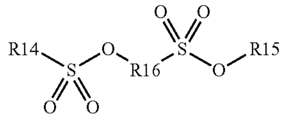

(7)

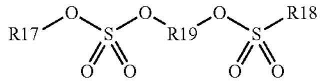

(8)

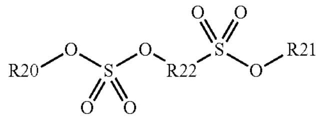

(9)

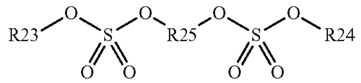

(10)

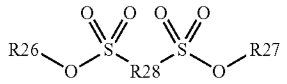

(11)

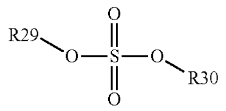

where

R1 is one of an alkyl group or a hydroxyalkyl group,

R2 is one of a hydrogen group or an alkyl group, each of R3 to R6 is one of a hydrogen group, an alkyl group, an alkoxy group, a halogenated alkyl group, or a halogenated alkoxy group, X is an alkylene group, each of R7 and R8 is one of a hydrogen group, an alkyl group, an alkenyl group, an alkoxy group, a halogenated alkyl group, a halogenated alkenyl group, or a halogenated alkoxy group, Y is an alkylene group, each of R9 and R10 is one of a hydrogen group, an alkyl group, or an alkenyl group, R9 and R10 are optionally bonded to each other, each of R11 and R12 is one of a hydrogen group or an alkyl group, R13 is an alkylene group, R11 and R12 are optionally bonded to each other, each of R14 and R15 is one of a hydrogen group or an alkyl group, R16 is an alkylene group, R14 and R15 are optionally bonded to each other, each of R17 and R18 is one of a hydrogen group or an alkyl group, R19 is an alkylene group, R17 and R18 are optionally bonded to each other, each of R20 and R21 is one of a hydrogen group or an alkyl group, R22 is an alkylene group, R20 and R21 are optionally bonded to each other, each of R23 and R24 is one of a hydrogen group or an alkyl group, R25 is an alkylene group, R23 and R24 are optionally bonded to each other, each of R26 and R27 is one of a hydrogen group or an alkyl group, R28 is an alkylene group, R26 and R27 are optionally bonded to each other, and each of R29 and R30 is one of a hydrogen group, an alkyl group, or a hydroxyalkyl group, (12)

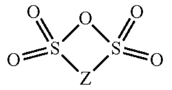

(13)

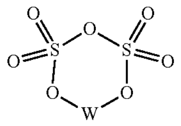

where each of Z and W is one of an alkylene group or an alkenylene group.

3. The secondary battery according to claim 2, wherein a content of the first sulfur-containing compound in the electrolytic solution is greater than or equal to 0.001 weight percent and less than or equal to 2.0 weight percent, and a content of the second sulfur-containing compound in the electrolytic solution is greater than or equal to 0.001 weight percent and less than or equal to 2.0 weight percent.

4. The secondary battery according to claim 1, wherein the film includes a third sulfur-containing compound and a fourth sulfur-containing compound, the third sulfur-containing compound includes a compound represented by Formula (14), a compound represented by Formula (15), or both, and the fourth sulfur-containing compound includes a compound represented by Formula (16), (14)

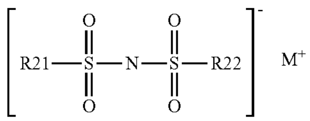

(15)

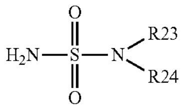

where each of R21 and R22 is one of a hydrogen group, a halogen group, an alkyl group, or a halogenated alkyl group, M is an alkali metal element, and each of R23 and R24 is one of a hydrogen group, an alkyl group, or a halogenated alkyl group, (16)

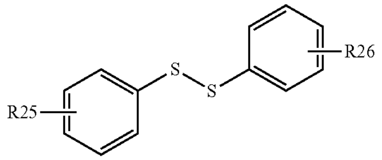

where each of R25 and R26 is one of a hydrogen group, an alkyl group, or a halogenated alkyl group.

5. The secondary battery according to claim 1, further comprising an outer package member having flexibility and containing the positive electrode, the negative electrode, and the electrolytic solution.

6. The secondary battery according to claim 1, wherein the secondary battery comprises a lithium-ion secondary battery.

* * * * *